US007980420B2

(12) United States Patent
Yamamiya

(10) Patent No.: US 7,980,420 B2
(45) Date of Patent: Jul. 19, 2011

(54) CARD DISPENSING APPARATUS

(75) Inventor: Takahito Yamamiya, Saitama (JP)

(73) Assignee: Asahi Seiko Kabushiki Kaisha, Tokyo (JP)

( * ) Notice: Subject to any disclaimer, the term of this patent is extended or adjusted under 35 U.S.C. 154(b) by 715 days.

(21) Appl. No.: 11/848,095

(22) Filed: Aug. 30, 2007

(65) Prior Publication Data
US 2009/0001095 A1    Jan. 1, 2009

(30) Foreign Application Priority Data

Aug. 30, 2006 (JP) .................. 2006-233261
Mar. 14, 2007 (JP) .................. 2007-064269
May 17, 2007 (JP) .................. 2007-131113

(51) Int. Cl.
G07F 11/16    (2006.01)
B65G 59/00    (2006.01)
B65H 3/00    (2006.01)

(52) U.S. Cl. .......... 221/268; 221/210; 221/232; 221/21; 221/231; 221/217; 221/258; 221/274; 221/94; 271/157; 271/145; 271/160; 271/165; 271/138; 271/135; 271/131; 700/231

(58) Field of Classification Search .................. 221/268, 221/210, 232, 21, 231, 217, 258, 274, 94; 271/157, 145, 160, 165, 138, 135, 131; 700/231
See application file for complete search history.

(56) References Cited

U.S. PATENT DOCUMENTS

| 1,633,937 | A | * | 6/1927 | Ford | 271/133 |
| 2,263,040 | A | * | 11/1941 | Kaltenbach | 221/213 |
| 2,265,007 | A | | 12/1941 | Ryan | |
| 2,680,614 | A | | 6/1954 | Gibson, Jr. | |
| 3,957,175 | A | * | 5/1976 | Gordon | 221/215 |
| 4,557,472 | A | | 12/1985 | Hannon | |
| 4,591,070 | A | * | 5/1986 | Wirstlin | 221/129 |
| 4,872,591 | A | * | 10/1989 | Konopka | 221/3 |
| 4,873,591 | A | * | 10/1989 | Kimura et al. | 360/85 |
| 4,993,587 | A | | 2/1991 | Abe | |
| 5,167,345 | A | * | 12/1992 | Bleeker | 221/17 |
| 5,232,123 | A | * | 8/1993 | Richardson et al. | 221/259 |
| 5,842,598 | A | * | 12/1998 | Tsuchida | 221/258 |
| 5,857,588 | A | | 1/1999 | Kasper | |
| 5,938,073 | A | * | 8/1999 | Chang | 221/259 |
| 5,941,414 | A | * | 8/1999 | Kasper | 221/210 |
| 5,950,865 | A | * | 9/1999 | Menes | 221/232 |
| 5,957,175 | A | * | 9/1999 | Smith | 144/195.1 |
| 6,098,840 | A | * | 8/2000 | Ito et al. | 221/232 |
| 7,172,116 | B2 | * | 2/2007 | Yamamiya | 235/381 |

FOREIGN PATENT DOCUMENTS

| DE | 194 40 013 | 4/1997 |
| FR | 2 585 682 | 2/1987 |
| FR | 2 827 263 | 1/2003 |
| GB | 1 307 201 | 2/1973 |

(Continued)

Primary Examiner — Gene O. Crawford
Assistant Examiner — Rakesh Kumar

(57) ABSTRACT

A card dispensing apparatus having a compact configuration has a housing to support a stack of cards on a fixed base. Openings in the base member can permit surfaces from a conveying member to extend into the housing and contact a surface of the lowest card. The conveyer member can move horizontal to a release point and retract beneath the base member to return to an initial position. A movement unit provides a cyclic looping movement of the conveyer member into and out of the housing for transporting cards. A feed unit positioned at the dispensing point of the cards can grasp and release the cards from the card dispensing apparatus.

15 Claims, 28 Drawing Sheets

FOREIGN PATENT DOCUMENTS

| | | |
|---|---|---|
| JP | 09-132335 | 5/1997 |
| JP | 09132335 A * | 5/1997 |
| JP | 10-293816 | 11/1998 |
| JP | 2000-076389 | 3/2000 |

* cited by examiner

Fig. 27
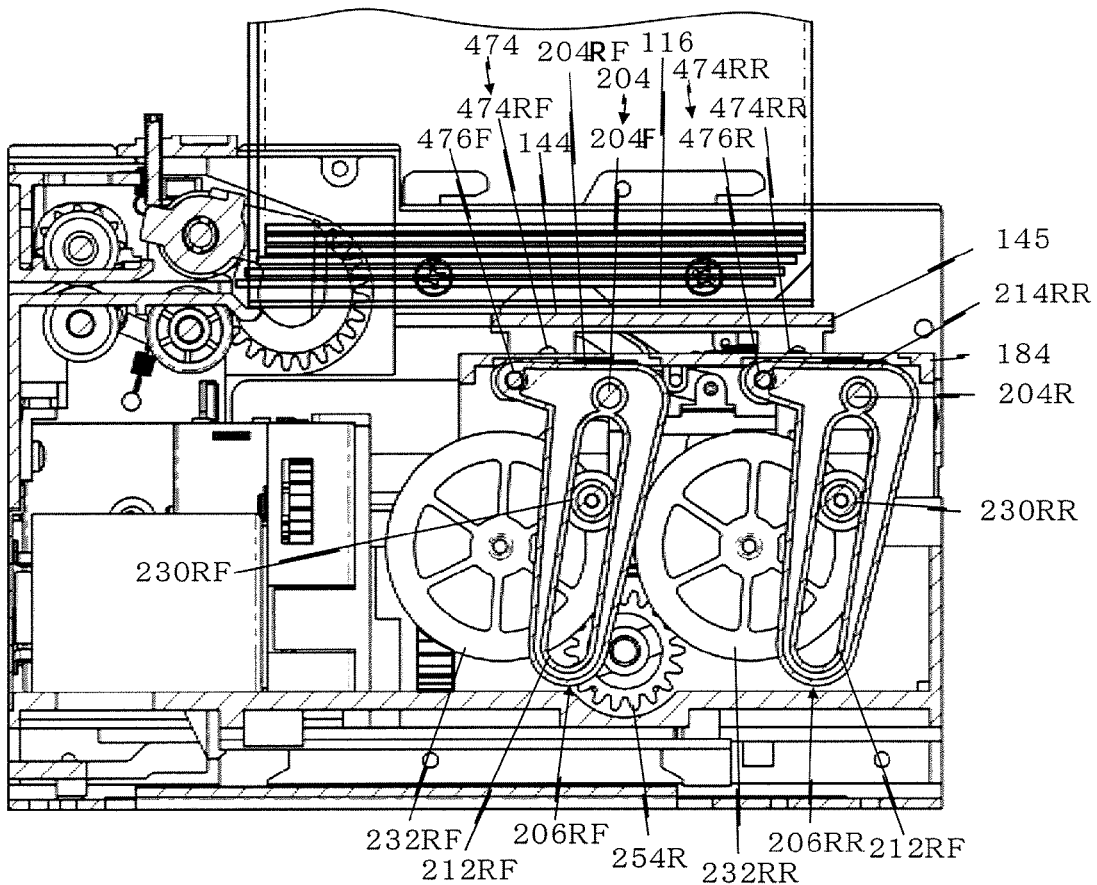
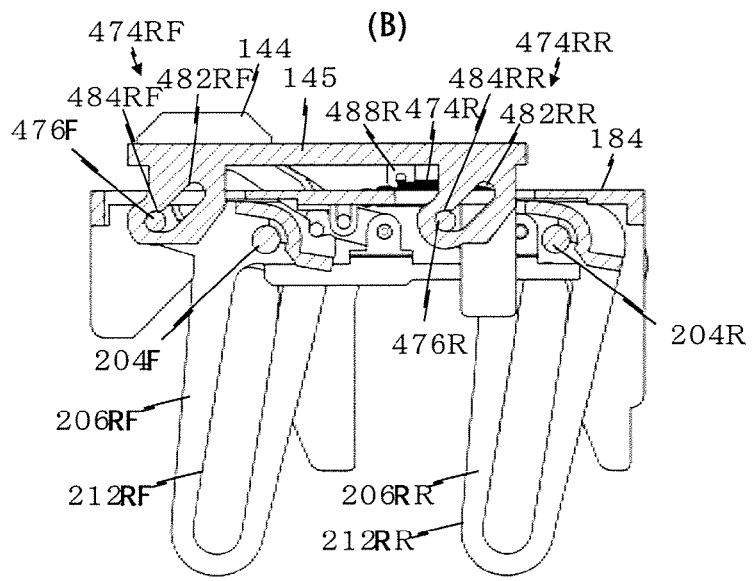

Fig. 28
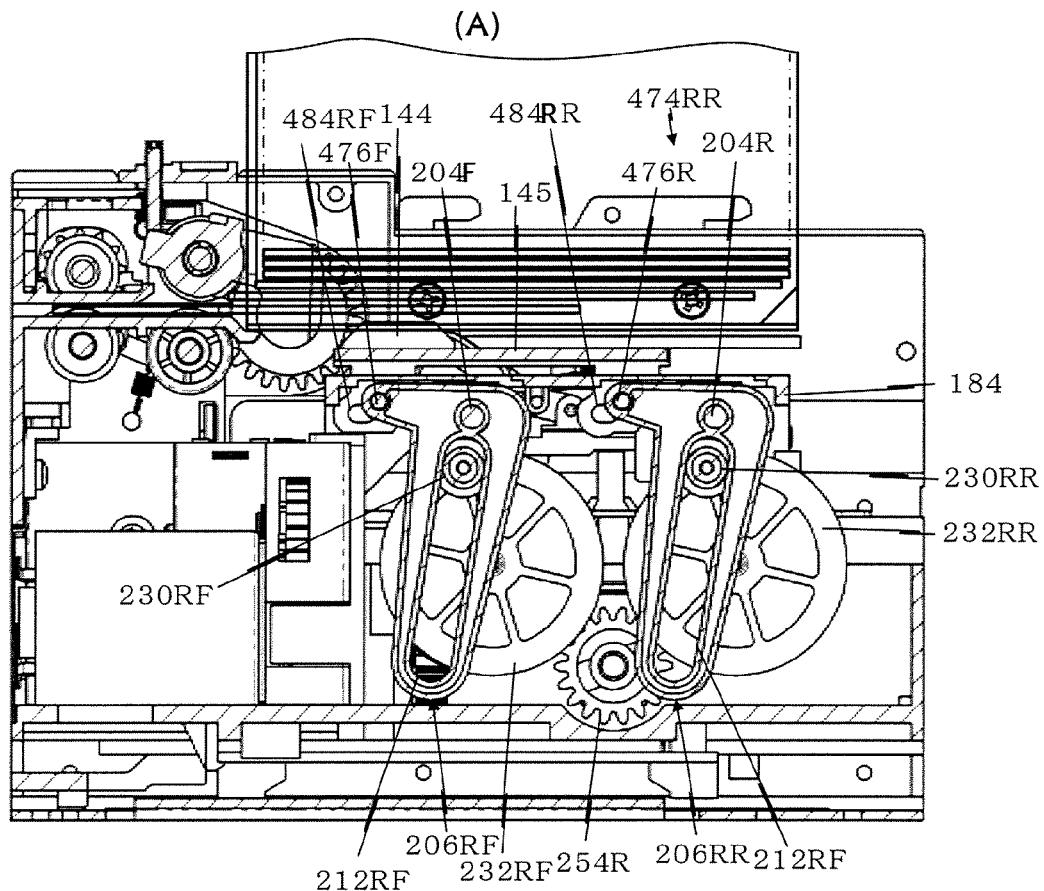
(A)
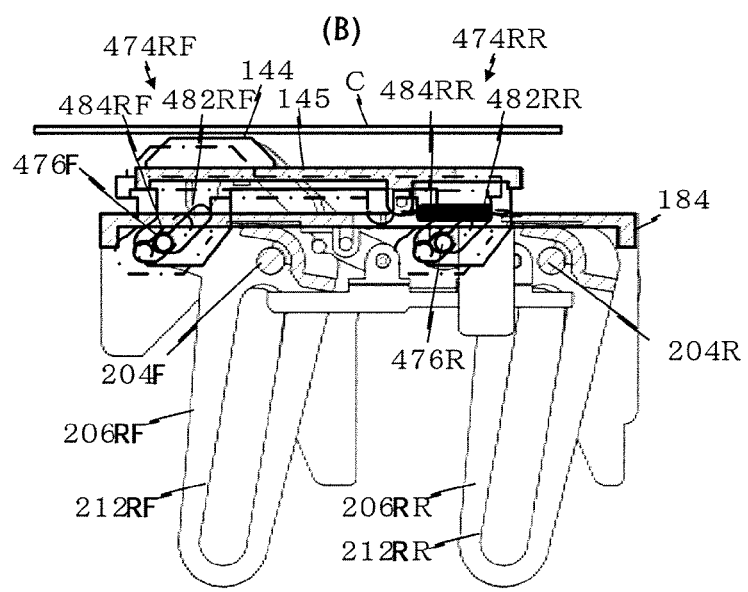
(B)

CARD DISPENSING APPARATUS

BACKGROUND OF THE INVENTION

1. Field of the Invention

The present invention relates to a small-card dispensing apparatus with increased capacity. In particular, the present invention relates to a card dispensing apparatus that dispenses stacked cards in a predetermined direction without damaging cards from extremely-thin to thick ones irrespectively of card material.

2. Description of Related Art

Here, "card" for use in the present specification is a generic name of a member in a thin plate shape, such as prepaid cards, character cards, IC cards, and others.

As a first conventional technology, a card dispensing apparatus is known in which a perimeter surface of a rotating roller is made to contact with the surface of a bottom card of a plurality of stacked cards and the card is dispensed by frictional contact (for example, refer to Japanese Utility-Model Publication No. 7-26272 (pp. 3-5, FIGS. 1-5)).

As a second conventional technology, a card dispensing apparatus is known in which a step portion of a reciprocating member that linearly reciprocates is engaged with a rear end of the bottom of stacked cards and the card is pushed out by the step portion (for example, refer to Japanese Laid-Open Patent Application Publication No. 10-293816 (Paragraph Nos. 0009-0115, FIGS. 20-25)).

As a third conventional technology, a card dispensing apparatus is known in which the perimeter surface of a flat belt that is moved in forward and reversed directions and can contact with an underside of one of the stacked cards at the bottom and the card is dispensed with a frictional contact by the flat belt (for example, refer to Japanese Laid-Open Patent Application Publication No. 9-132335 (Paragraph Nos. 0009-0046, FIGS. 1-4)).

As a fourth conventional technology, a card dispensing apparatus is known in which the surface of one of the stacked cards at the top is placed in frictional contact with a feeding pad that makes an arc movement and the card is dispensed by the arc movement of the feeding pad (for example, refer to Japanese Laid-Open Patent Application Publication No. 2000-76389 (Paragraph Nos. 0012-0044, FIGS. 3-4)).

There is still a need in this industry to provide a high speed and compact card dispensing apparatus that can selectively dispense cards in an efficient manner without damaging the cards.

SUMMARY OF THE INVENTION

In the first conventional technology, the perimeter surface of the roller has a frictional contact with the underside of the card, and the card is dispensed in a predetermined direction with the frictional contact between the perimeter surface of the roller and the underside of the card. If the roller has a small diameter, the underside of the card and the perimeter surface of the roller have a linear contact in a microscopic sense. Therefore, the contact pressure between the roller and the card surface is large. If the contact pressure of the roller with respect to the card surface is large, when a card made of soft material, for example, when a card made of paper is to be dispensed, the card can be rubbed by the roller and may be damaged.

To solve this problem, it may be contemplated that a roller made of a soft material is used to increase the amount of deformation of the roller and to increase the contact area between the card and the roller. However, since the abrasion speed of the roller is increased, this can cause a problem.

Furthermore, in another possible solution, the roller can be formed to have a large diameter to increase the contact area with the card. However, since the apparatus is upsized according to an increase in the diameter of the roller, this can cause other problems.

Still further, the card dispensed by the roller is nipped between a dispensing roller and supplemental dispensing roller pulling at a higher speed than that of the dispensing speed of the roller for card dispensing.

When the amount of stacked cards is increased, the weight applied to the card at the bottom is also increased. Since the dispensing speed of the dispensing roller is slower than the pulling speed, a drawing resistance of the card at the bottom is significantly increased due to an increase in contact pressure between the dispensing roller and the card at the bottom. This may not allow drawing of the card between the dispensing roller and the supplemental dispensing roller.

To solve this issue, a diameter of the dispensing roller can be increased to further increase the contact area. As described above, however, the overall size of the dispensing apparatus is also increased. As a result, the area for stacking cards is restricted.

In the second conventional technology, the rear end of the card at the bottom is pressed by the step portion of the reciprocating member. Therefore, the ejection force is concentrated on an end portion of the card pressed by the step portion. For example, when cards made of paper are used, the end portion of the card may be plastically deformed.

Also, when the amount of stacked cards is increased, since the weight applied to the card at the bottom is increased, a movement resistance of the card at the bottom is increased to further plastically deform the end portion of the card by the step portion, then the amount of stacking cards is restricted.

In the third conventional technology, friction between the flat belt that is moved selectively in a forward or reversed direction and the card surface produces a driving force on the card.

In this configuration, at a pulley portion around which the flat belt is wound, the flat belt and the card surface make contact with each other with a predetermined contact pressure, but the contact pressure between the flat belt and the card surface at a portion where a pulley is not present is decreased. For this reason, a force in a dispensing direction is applied to the card due to the friction between the flat belt and the card surface mainly at the pulley portion, a problem similar to that in the first conventional technology arises. Also, when the amount of stacked cards is increased, the weight applied to the card at the bottom is increased. Therefore, as with the first conventional technology, the amount of stacking cards is restricted.

In the fourth conventional technology, after the surface of the card at the top is made to contact with a dome-shaped feeding pad, the feeding pad is swung in the dispensing direction to linearly dispense the card.

After the card is dispensed, the feeding pad is separated from the surface of the card surface and is then swung in a direction reverse to the dispensing direction to be returned to the contact position in preparation for the next dispensing of a card. In this configuration, since the feeding pad has a dome shape but is not a roller, the curvature can be increased within a limited range, thereby suppressing an increase in contact pressure with respect to the card surface. However, since the feeding pad makes a fan-shaped movement, sliding necessarily occurs with the card surface, thereby possibly damaging the card surface.

Also, when the amount of stacking cards is increased, the weight applied to the card at the bottom is increased. Therefore, as with the first conventional technology, the amount of stacking cards is restricted.

A first object of the present invention is to provide a card dispensing apparatus that does not damage cards, even if the cards are made of a potential vulnerable material.

A second object of the present invention is to provide a card dispensing apparatus that can achieve the first object without upsizing the apparatus.

A third object of the present invention is to provide a card dispensing apparatus that can achieve the first object at a relatively low cost.

A fourth object of the present invention is to provide a card dispensing apparatus that can dispense cards even if the total amount of stacking cards is increased.

To achieve these objects, the card dispensing apparatus according to the present invention is configured as follows. A card dispensing apparatus in which a surface of one of cards is pressed toward a base which is disposed in a fixed state to hold the cards in a columnar shape and a conveying member in contact with the card surface via an opening in the base, is moved in a predetermined direction, thereby dispensing the cards one by one in the predetermined direction. Wherein the conveying member has a flat contact surface, and is moved by a flat loop movement unit to advance into an opening from a predetermined advancing position to make surface contact with the card surface. The card is linearly moved in a predetermined direction while maintaining a contact state, then retracted from the opening to a retract position, and then moved to the advancing position.

The flat loop movement unit includes a reciprocating member that linearly reciprocates in the card dispensing direction and moves in a direction forming a right angle with the dispensing direction.

The reciprocating member includes a first reciprocating member that linearly reciprocates in the card dispensing direction and a second reciprocating member that reciprocates in a direction forming a right angle with a moving direction of the first reciprocating member.

The second reciprocating member has an L shape, the second reciprocating member has elongated holes extending in a direction forming a right angle with a moving direction of the first reciprocating member and is pivotally supported by the first reciprocating member. The elongated holes have crank pins inserted therein, the crank pins can make contact with a cam that moves, in the course of rotation, integrally with the first reciprocating member from an area near a most retract position of the first reciprocating member to an area near a most advancing position thereof. The crank pins make contact with the cam so that the second reciprocating member makes a pivot movement to cause the conveying member to move in a direction away from the first reciprocating member.

A plurality of the second reciprocating member are disposed so as to be shifted in the card dispensing direction.

The crank pins protrude from cranks each mounted at both ends of a relevant one of rotating shafts disposed so as to form a right angle with a card advancing direction, and the rotating shafts are disposed among the cranks and are gear-connected with an output shaft of an electric motor with a rotating axis line being orthogonal to the rotating shafts.

The apparatus further includes card drawing device adjacent to the conveying member, and a stroke of the conveying member in the dispensing direction is within a range facing a last end card when a tip of the card is near a drawing unit.

The base has a pressing inclined surface that faces a rear end of the card and is inclined in a front downward direction toward the drawing unit, and the card mounted on the base is pressed toward the drawing unit.

As a result of the present invention, the cards are held in a columnar shape and the card at the bottom portion is supported by a base having an opening that faces the surface of the card and is held at a predetermined position. When a dispensing signal is output, the conveying member advances into the opening of the base at the most retractable position, and its contact surface makes a surface contact with the surface of the card.

The conveying member is caused to make a flat loop movement by the flat loop movement unit. That is, the conveying member is linearly moved in the card dispensing direction by the flat loop movement unit, and therefore the card is moved in the dispensing direction together with the conveying member with frictional contact with the conveying member.

Since the conveying member makes a surface contact with the card surface, the contact pressure is evenly distributed over the contact surface, and the contact pressure is not concentrated on a limited part of the card surface. When the conveying member reaches an advancing position, the conveying member is retracted from the opening to release the surface contact with the card surface. Next, the conveying member is moved to the advancing position while the state away from the card is kept. Thus, since the conveying member slides less over the card surface, there is an advantage of not damaging the card even if the card is made of a material with a low hardness.

The flat loop movement unit includes a reciprocating member that linearly reciprocates in the card dispensing direction and moves in a direction forming a right angle with the dispensing direction, and the conveying member makes a flat loop movement by the flat loop movement unit. The conveying member makes contact with the surface of the card as a part of the flat loop movement, and moves in the card dispensing direction while the surface contact moves the card in the same direction.

After interlocked, the conveying member is retracted from the opening of the base to release the surface contact with the card. Then, the conveying member is moved in a direction reverse to the dispensing direction to return to the advancing position. Thus, the conveying member does not make a frictional contact with the card surface when returning from the dispensing position to the advancing position, and therefore does not damage the card.

Also, the flat loop movement of the conveying member is achieved by the reciprocating member that linearly reciprocates in the card dispensing direction and also moves in a direction forming a right angle with the dispensing direction. Therefore, the configuration is simple, and low-cost manufacturing can be achieved.

The reciprocating member includes a first reciprocating member that linearly reciprocates in the card dispensing direction and a second reciprocating member that reciprocates in a direction forming a right angle with a moving direction of the first reciprocating member, thereby achieving a flat loop movement. In this configuration the movement of the conveying member can be achieved by the first reciprocating member and the second reciprocating member each making a linear reciprocating movement. Therefore, the configuration is also simple, and low-cost manufacturing can be achieved.

When the crank pins are rotated, the crank pins each move along the elongated holes of the second reciprocating member, and provide the second reciprocating member with a reciprocating movement in the card dispensing direction and also its reverse direction. With this movement of the second reciprocating member, the first reciprocating member, with the second reciprocating member being pivotally supported, is linearly reciprocated in the card dispensing direction and its reverse direction.

Near the furthest retract position of the first reciprocating member, the crank pins make contact with the cam moving integrally with the first reciprocating member to move the first moving member backward. The second reciprocating member is caused to make a pivot movement with respect to the first conveying member to be moved in a direction away from the first reciprocating member. With this movement, the conveying member makes a surface contact with the card at the furthest end of the card line via the opening of the base.

With a further rotation of the crank pins, the second reciprocating member is moved in the dispensing direction. Therefore, the first reciprocating member is also integrally moved in the dispensing direction to reach the most advancing position. In the course of this operation, the second reciprocating member continues to make a frictional contact with the card surface of the conveying member in cooperation with the cam and the crank pins. Thus, the card at the furthest end position is conveyed in the dispensing direction with the surface contact with the conveying member.

With the first reciprocating member being near the most advancing position and with a further rotation of the crank pins, the crank pins are released from the contact with the cam. With this, the second reciprocating member faces the position of the crank pins and can move. In other words, the second reciprocating member can make a pivot movement in a direction of approaching the first reciprocating member. Therefore, the second reciprocating member is retracted from the opening with the pressure by the card, thereby releasing the frictional contact with the card surface.

With the subsequent rotation of the crank pins, the second reciprocating member is moved in a direction reverse to the dispensing direction. Therefore, the first reciprocating member is also moved in the same direction in an interlocked manner to be moved to the furthest retract position.

The plurality of the second reciprocating members is disposed so as to be shifted in the card dispensing direction. Therefore, the conveying member can be moved in a parallel manner with a simple device and the apparatus can be downsized and configured at low cost.

The crank pins protrude from cranks, each mounted at both ends of a relevant one of rotating shafts, and disposed so as to form a right angle with a card advancing direction. Rotating shafts are disposed among the cranks and are gear-connected with an output shaft of an electric motor with a rotating axis line being orthogonal to the rotating shafts. In other words, the axial line of the electric motor is disposed in parallel to the same direction as the card dispensing direction. Therefore, the width of the card dispensing apparatus is not affected by the shaft length of the electric motor. Since the width of the card dispensing apparatus is not restricted by the size of the electric motor, the width of the card dispensing apparatus can be made narrow, thereby advantageously making a small card dispensing apparatus.

A card drawing device is further provided adjacently to the conveying member, and a stroke of the conveying member in the dispensing direction is within a range facing a last end card when a tip of the card is near the drawing device. In this configuration, a slip occurs between the card and the conveying member. If a card has not been passed to the card drawing device with one dispensing movement of the conveying member, a card is again conveyed by the conveying member. In this case, the stroke of the conveying member faces the last-end card when the tip of the card is near the drawing device.

In other words, when the conveying member again makes contact with the card once dispensed, the conveying member makes a surface contact with only the same card, and does not make contact with the card second from the last end. Thus, a conveyance force is transmitted only to the last-end card even if the conveying member again provides a dispensing movement to the same card, thereby advantageously preventing two cards from being dispensed.

The base has an inclined pressing surface that faces a rear end of the card and is inclined in a front downward direction toward the drawing unit. In this configuration, the rear end of the card, at the lower portion, is pressed by the inclined pressing surface toward the drawing unit. A card at the bottom can pass through the two-sheet dispensing preventing unit, while the upper-mounted card is inhibited by the two-sheet dispensing preventing unit. With this configuration, normally, the cards on the lower portion are in a stepwise shape.

When cards are newly stacked, the rear ends of the cards are pressed out by the inclined pressing surface for stacking in a stepwise shape. In other words, at the time of initial setting, the card stacking state is automatically set to a state similar to a normal dispensing state. Therefore, the card stacking state can be initially set so as to be close to a normal state before dispensing, thereby advantageously allowing support with a normal dispensing setting.

The card dispensing apparatus has a surface of one of cards pressed toward a base disposed in a fixed state to hold the cards in a columnar shape. A conveying member in contact with the card surface via an opening of the base is caused, by a flat loop movement unit, to make a dispensing motion with a flat loop movement based on a dispensing instruction, thereby dispensing the cards one by one in the predetermined direction and then actively drawing the dispensed card by card feeding unit that can actively draw a card for dispensing. A card-dispensing detecting unit is disposed downstream from the card feeding unit and, based on a card dispensing signal from the card-dispensing detecting unit, the flat loop movement unit and the card feeding unit are stopped.

In this configuration, when it is detected by the card-dispensing detecting unit that the card has been drawn from the card feeding unit, the flat loop movement unit and the card feeding unit are stopped. In other words, card delivering is completely stopped, and two cards are not dispensed.

The cards stacked and held on the base, in a columnar shape, make a surface contact with the conveying member that has passed through the opening of the base and advances, and one of the cards is then dispensed with a linear movement of the conveying member in the card dispensing direction. The conveying member is provided with a linear movement in the card dispensing direction by the flat loop movement unit. With friction occurring due to a surface contact with the lower surface of the card, the card at the bottom is dispensed to the dispensing direction. The tip of the dispensed card at the bottom is drawn by the feeding unit from the holding unit.

When the card is drawn in the dispensing direction by the feeding unit, the conveying member can move in a direction of retracting from the opening. In other words, the conveying member moves in a direction away from the card at the bottom, thereby reducing the friction between the conveying member and the card. The drawing resistance of the card becomes close to a drawing resistance occurring due to a frictional contact with the base on which cards are mounted. With this, the card can be easily drawn by the feeding unit. Thus, drawing can be performed without upsizing the apparatus even if the amount of stacking cards is increased.

A second reciprocating member is moved in the card dispensing direction with a linear movement of the first reciprocating member. The second reciprocating member is moved at a predetermined timing in a direction forming a right angle with respect to the moving direction of the first reciprocating member.

Since the conveying member is mounted to the second reciprocating member, after the second reciprocating member moves from a most retracted position of the first retracting position toward the holding unit in the right-angle direction, the first reciprocating member moves in the card dispensing direction, and the second reciprocating member moves in a right-angle direction in which the second reciprocating member moves away from the holding unit. Next, the first reciprocating member moves in a direction reverse to the card dispensing direction, thereby performing a flat loop movement.

At the time of movement of the conveying member toward the holding unit, the conveying member passes through the opening of the base to advance into the holding unit. With this, the conveying member can make contact with the lower surface of a bottom card. Then, with the subsequent movement of the first reciprocating member in the card dispensing direction, the cards stacked and held in a columnar shape on the base are dispensed with a linear movement of the conveying member in the card dispensing direction. With this dispensing, when the tip of the card is drawn by the drawing means, the conveying member moves in the same direction by following the movement of the card.

With this movement, the conveying member is moved by the retracting unit from the opening to a retract direction. In other words, the conveying member is moved by the retracting member in a direction of retracting from the holding unit, thereby reducing the contact pressure between the conveying member and the card. With this, the drawing resistance of the card becomes close to the drawing resistance occurring due to a frictional contact with the base on which the cards are mounted. Thus, a card can be drawn without upsizing the apparatus even when the amount of stacking cards is increased.

The second reciprocating member is moved in the card dispensing direction with a linear movement of the first reciprocating member. The second reciprocating member is moved at a predetermined timing in a right-angle direction with respect to the moving direction of the first reciprocating member.

Since the conveying member is mounted on the second reciprocating member, after the second reciprocating member moves in the right-angle direction toward the holding unit from a most retracted position of the first reciprocating member, the first reciprocating member moves in the card dispensing direction, and the second reciprocating member moves in the right-angle direction away from the holding unit. Then the first reciprocating member moves in a card anti-dispensing direction, thereby allowing a flat loop movement.

At the time of movement of the conveying member toward the holding unit, the conveying member passes through the opening of the base to advance into the holding unit, thereby causing the conveying member to make a surface contact with the lower surface of a card at the bottom. Then, with the subsequent movement of the first reciprocating member in the card dispensing direction, the card at the bottom, among the cards stacked and held in a columnar shape on the base, is dispensed with a linear movement of the conveying member in the card dispensing direction. With this dispensing, when the tip of the card is drawn by the feeding unit, the conveying member is moved according to the movement of the card in the same direction against a tension of the pressing unit.

With this movement, the conveying member is guided from the opening to a retracting direction by an interlocked shaft guided by a guide hole inclined in a direction away from the dispensing direction. In other words, the conveying member is guided by the guide hole and the interlocked shaft in a direction of retraction from the holding unit, thereby reducing a contact pressure between the conveying member and the card. The drawing resistance of the card becomes close to the drawing resistance occurring due to a frictional contact with the base on which the cards are mounted. Thus, a card can be drawn without upsizing the apparatus even when the amount of stacking cards is increased. Also, since a retracting movement of the conveying member is performed with the guide hole and the interlocked shaft, so that the apparatus can be downsized and configured at low cost.

The second reciprocating member is moved in the card dispensing direction with a linear movement of the first reciprocating member. The second reciprocating member is moved at a predetermined timing in a right-angle direction with respect to the moving direction of the first reciprocating member.

The conveying member, which can make a pivoting movement with respect to the first reciprocating member that reciprocates in a horizontal direction, is mounted on the L-shaped second reciprocating member extending in a almost perpendicularly-standing direction with respect to a horizontal lever extending in a horizontal direction, and reciprocates in a direction forming a right angle with a moving direction of the first reciprocating member. Therefore, after the second reciprocating member is caused to make a pivot movement in one direction from the most retracted position of the first reciprocating member to move toward the holding unit, the first reciprocating member moves in the card dispensing direction. The second reciprocating member is then caused to make a pivot movement in a direction that is reverse to the above direction from the most advancing position of the first reciprocating member to move in a direction away from the holding unit. Next, the first reciprocating member moves in a card anti-dispensing direction, thereby allowing a flat loop movement.

At the time of movement of the conveying member toward the holding unit, the conveying member passes through the opening of the base to advance into the holding unit, thereby causing the conveying member to make a surface contact with the lower surface of a card at the bottom. Then, with the subsequent movement of the first reciprocating member in the card dispensing direction, the card at the bottom among the cards stacked and held in a columnar shape on the base is dispensed with a linear movement of the conveying member in the card dispensing direction.

When the tip of the card is drawn by the feeding unit, the conveying member is moved according to the movement of the card in the same direction. With this movement, since the guide hole extending in a direction away from the dispensing direction is relatively moved with respect to the interlocked shaft, the conveying member is guided by the interlocked shaft from the opening to a retracting direction. In other words, the conveying member is guided by the guide hole and the interlocked shaft in a direction of retracting from the holding unit, thereby a contact pressure between the conveying member and the card are reduced. Thus, the drawing resistance of the card becomes close to the drawing resistance occurring due to a frictional contact with the base on which the cards are mounted. Thus, a card can be drawn without upsizing the apparatus even when the amount of stacking cards is increased.

Also, since a retracting movement of the conveying member is performed with the first reciprocating member, the second reciprocating member, the guide hole, and the interlocked shaft, the apparatus can be downsized and configured at low cost.

The second reciprocating member is moved in the card dispensing direction with a linear movement of the first reciprocating member. The second reciprocating member is moved at a predetermined timing in a right-angle direction with respect to the moving direction of the first reciprocating member.

The conveying member can make a pivot movement with respect to the first reciprocating member that reciprocates in a horizontal direction, is mounted on the L-shaped second reciprocating member extending in an almost perpendicularly-standing direction with respect to a horizontal lever extending in a horizontal direction, and reciprocates in a direction forming a right angle with a moving direction of the first reciprocating member. Therefore, after the second reciprocating member is caused to make a pivoting movement in one direction from a most retracted position of the first reciprocating member to push a passive hole of a guide hole higher by an interlocked shaft to move toward the holding unit, the first reciprocating member moves in the card dispensing direction. The second reciprocating member is then caused to make a pivoting movement in a direction reverse to the above direction from the most advancing position of the first reciprocating member to move in a direction away from the holding unit via the guide hole by the interlocked shaft. Next, the first reciprocating member moves in a card anti-dispensing direction, thereby allowing a flat loop movement.

Since the conveying member is pressed in the anti-dispensing direction, the interlocked shaft stays in the passive hole unless the conveying member is drawn by the card. When the conveying member moves toward the holding unit, the interlocked shaft engages with the passive hole for pushing higher. With this, the interlocked shaft pushes the edge of the passive hole higher approximately from the right-angle direction. Therefore, the multilayered cards can be pushed higher.

At the time of movement of the conveying member toward the holding unit, the conveying member passes through the opening of the base to advance into the holding unit, thereby causing the conveying member to make a surface contact with the lower surface of the card at the bottom. Then, with the subsequent movement of the first reciprocating member in the card dispensing direction, the cards stacked and held in a columnar shape on the base are dispensed with a linear movement of the conveying member in the card dispensing direction.

With this dispensing, when the tip of the card is drawn by the feeding unit, the conveying member is moved according to the movement of the card in the same direction against a tension of the pressing unit. With this movement, since the guide hole extending in a direction away from the dispensing direction is relatively moved with respect to the interlocked shaft, the conveying member is guided by the interlocked shaft from the opening to a retracting direction. In other words, the conveying member is guided by the guide hole and the interlocked shaft in a direction of retracting from the holding unit, thereby reducing a contact pressure between the conveying member and the card. The drawing resistance of the card becomes close to the drawing resistance occurring due to a frictional contact with the base on which the cards are mounted.

Thus, a card can be drawn without upsizing the apparatus even when the amount of stacking cards is increased. Also, since a retracting movement of the conveying member is performed with the first reciprocating member, the second reciprocating member, the guide hole, the interlocked shaft, and the elastic member, the apparatus can be downsized and configured at low cost. In particular, the cards can be pushed higher with the passive hole. Therefore, pushing can be ensured even if the amount of stacking cards is increased.

In a card dispensing apparatus in which a surface of one of the stacked cards is pressed toward a base disposed in a fixed state to hold the cards in a columnar shape and a conveying member in contact with the card surface via an opening of the base is moved in a predetermined direction, thereby dispensing the cards one by one in the predetermined direction, wherein the conveying member has a flat contact surface and is moved by flat loop movement units.

The flat loop movement unit advances into the opening from a predetermined advancing position to make surface contact with s card surface and includes a reciprocating member that linearly reciprocates in the card dispensing direction and moves in a direction orthogonal to the dispensing direction. The reciprocating member includes a first reciprocating member that linearly reciprocates in the card dispensing direction and a second reciprocating member that reciprocates in a direction forming a right angle with a moving direction of the first reciprocating member.

The second reciprocating member has an L shape with elongated holes extending in a direction from top to bottom, the second reciprocating member is pivotally supported by the first reciprocating member and guided so as to move in linearly manner. The elongated holes have crank pins inserted therein. The crank pins can make contact with a cam that moves, in the course of rotation, integrally with the first reciprocating member from an area near a most retracted position of the first reciprocating member to an area near a most advancing position thereof, with the crank pins making contact with the cam.

The second reciprocating member is caused to make a pivotal movement to cause the conveying member to move in a direction away from the first reciprocating member, a plurality of the second reciprocating members are disposed so as to be shifted in the card dispensing direction, the crank pins protrude from cranks each mounted at both ends of a relevant one of rotating shafts disposed so as to form a right angle with a card advancing direction, and the rotating shafts are disposed among the cranks and are gear-connected with an output shaft of an electric motor with a rotating axis line being orthogonal to the rotating shafts.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 27 depicts cross sectional views along the C-C line in FIG. 24 and an explanatory drawing of the operation in a state immediately before a conveying member dispenses a card in the card holding means in the third embodiment; and FIG. 28 depicts cross sectional views along the C-C line in FIG. 24 and an explanatory drawing of the operation in a state where feeding means starts drawing cards in the third embodiment.

DETAILED DESCRIPTION OF THE PREFERRED EMBODIMENTS

Figure 1:
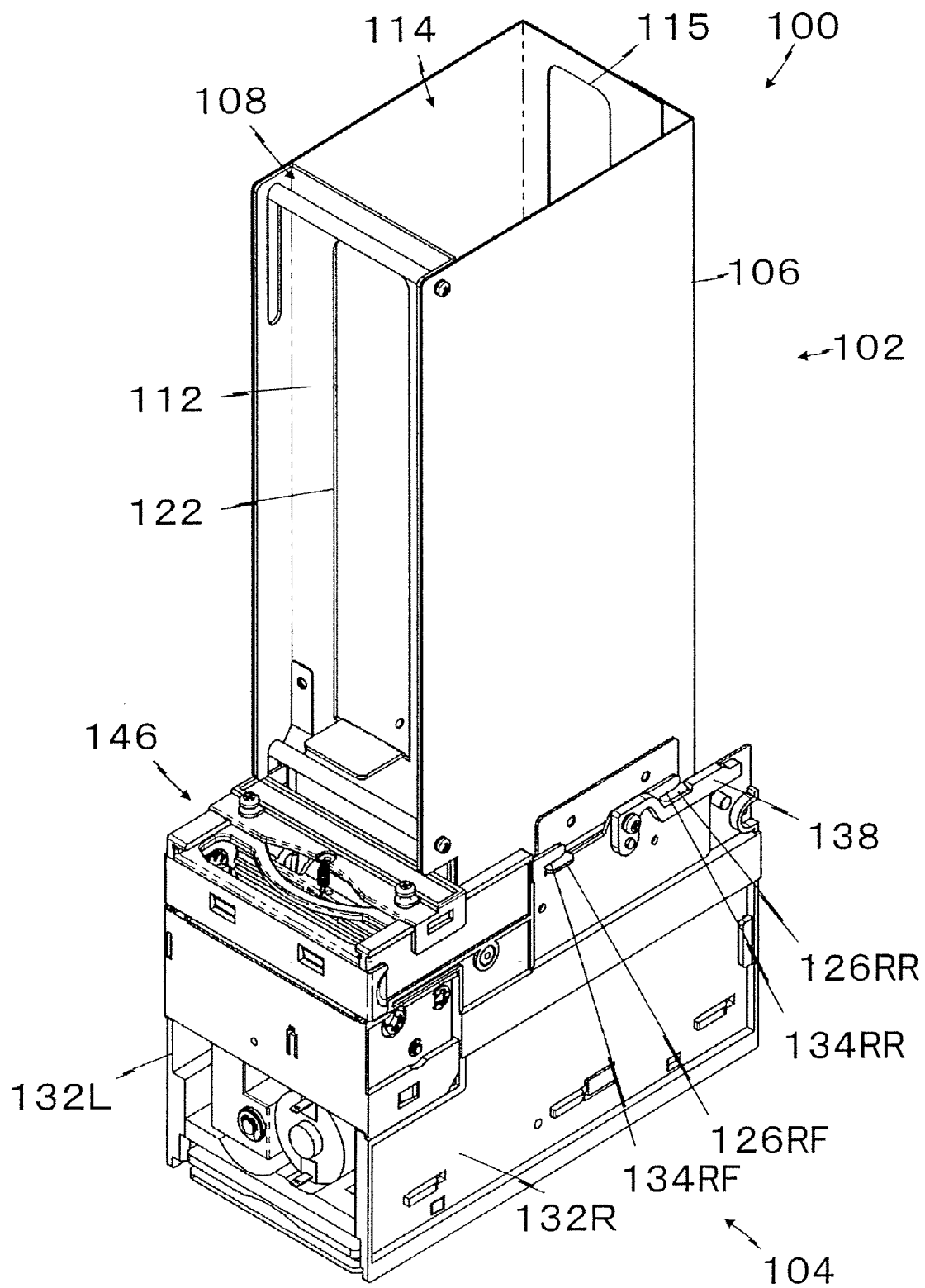
FIG. 1 is a perspective view of a card dispensing apparatus according to a first embodiment.
Figure 2:
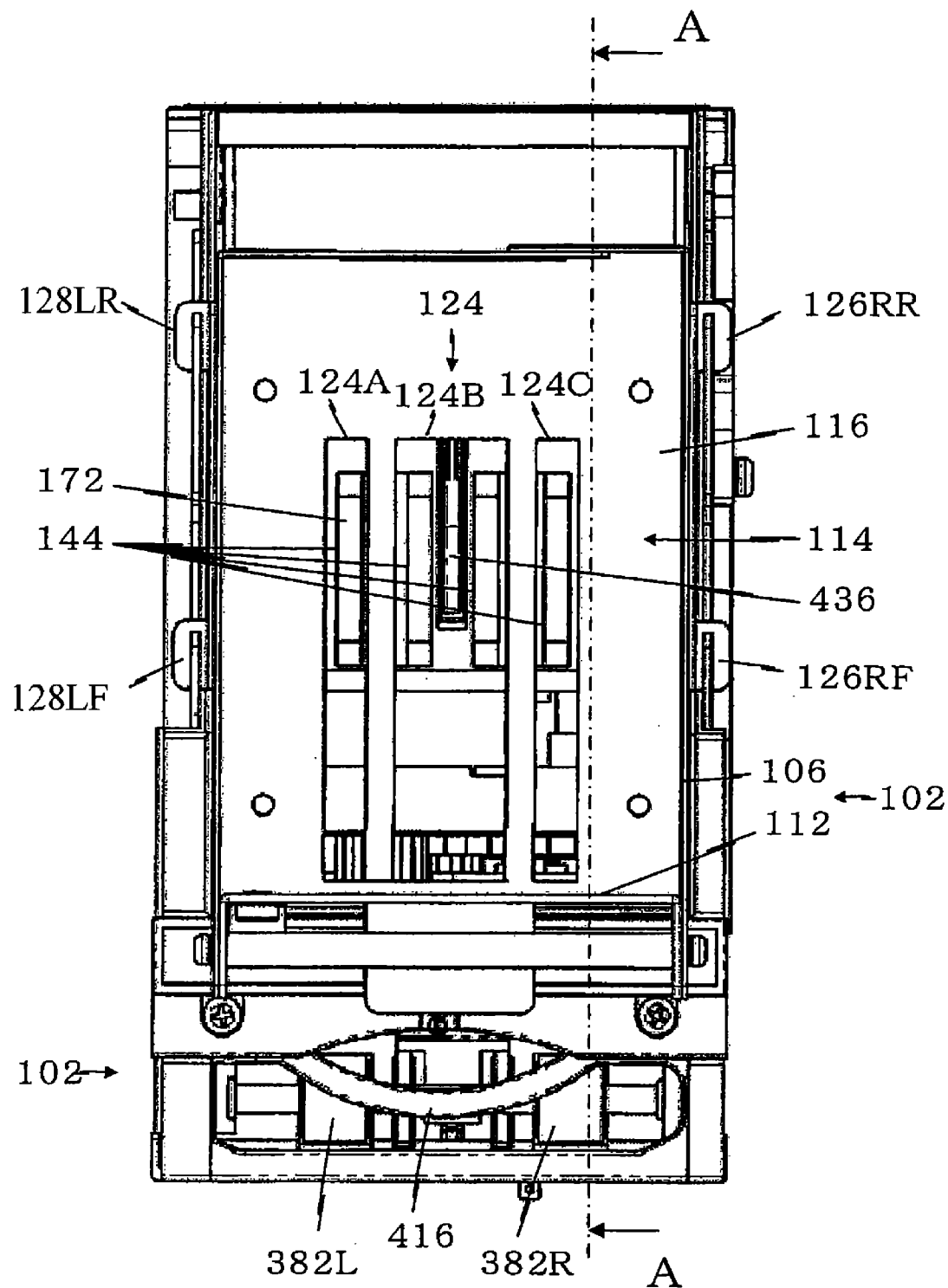
FIG. 2 is a plan view of the card dispensing apparatus according to the first embodiment.

Reference will now be made in detail to the preferred embodiments of the invention which set forth the best modes contemplated to carry out the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

A card dispensing apparatus 100 has a function of separating and dispensing cards one by one from end of a stack line of cards lined up in a columnar shape with their surfaces being closely contacted with each other. The card dispensing apparatus 100 broadly includes a card holding unit 102 and a card dispensing unit 104.

First, the card holding unit 102 is described. The card holding unit 102 has a function of lining up and holding cards in a columnar shape with their surfaces being closely contacted with each other. In the present embodiment, the card holding unit 102 includes an opening 108 on one side surface of a holding member 106 in a channel shape when viewed in a plane, it is closed with a vertically-elongated rectangular removable lid 112 to form a vertically-oriented holding room or container 114 that is rectangular in cross section. The card holding unit 102 has a bottom surface being closed with a base 116.

Figure 5:
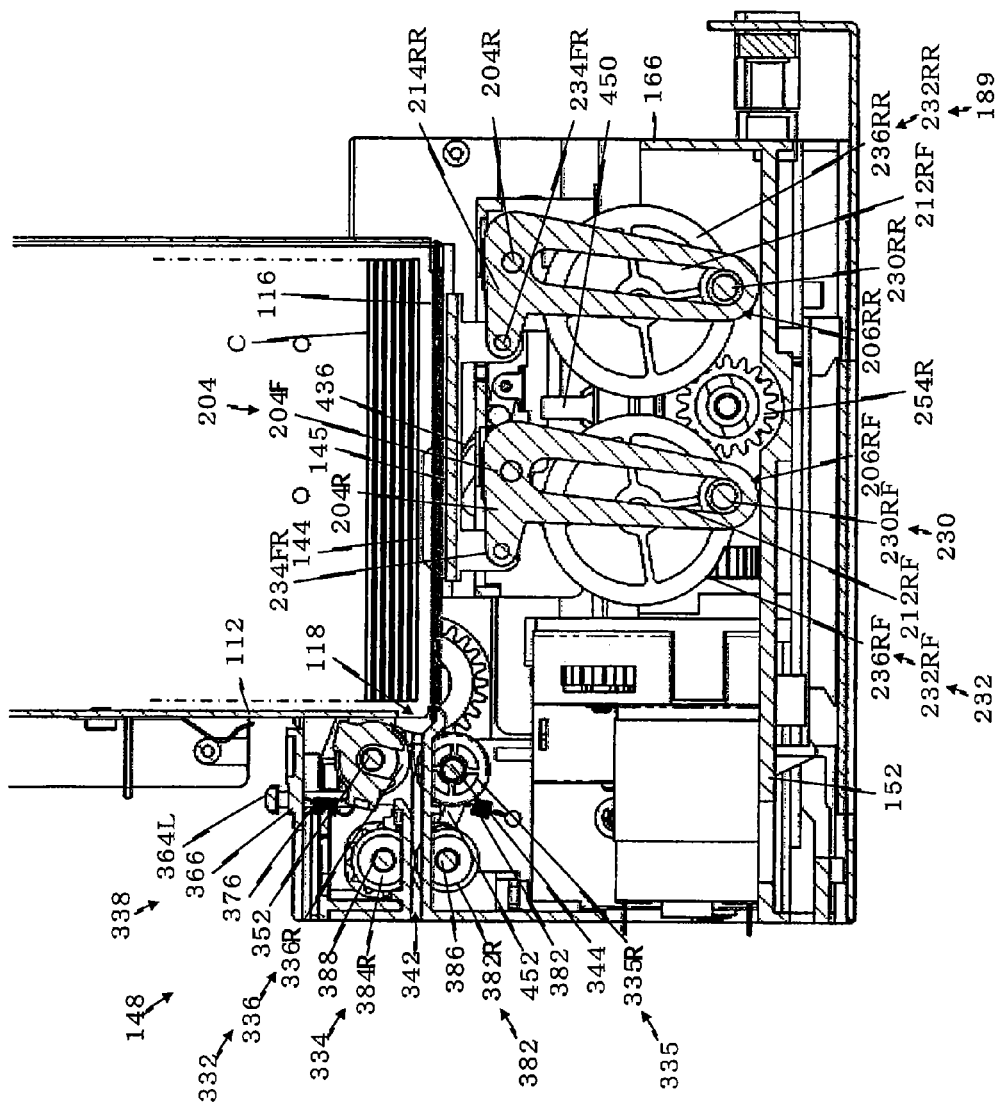
FIG. 5 is a cross sectional view taken along an A-A line in FIG. 2.

Cards C, as depicted in FIG. 5, are mounted on the base 116, piled up in a vertical direction inside the holding barrel 114, and held with their surfaces being closely contacted with each other. An exit 118 is formed in a horizontally-elongated rectangular slit shape between a lower end of the lid 112 disposed at the opening 108 of the card holding unit 102 and the base 116. The exit 118 has a height approximately three times longer than the thickness of the card C. The base 116 has formed thereon an opening 124 into which a conveying member, which will be described further below advances.

In the present embodiment, the opening 124 is formed by a combination of three openings 124A, 124B, and 124C. Here, the holding member 106 has formed thereon a vertically-elongated peephole 115, whilst the lid 112 has formed thereon a vertically-elongated peephole 122.

The card holding unit 102 is mounted so as not to be dropped by engaging protrusions 126LF and 126LR horizontally protruding laterally from a lower portion of a left side wall of the holding member 106 and protrusions 128RF and 128LF horizontally protruding laterally from a lower portion of a right side wall thereof with horizontally-elongated engaging grooves 134LF and 134LR of a left side wall 132L of the card dispensing unit 104 and horizontally-elongated engaging groves 136RF and 136RR of a right side wall 132R thereof, respectively, and by being locked with a lock strip 138.

Here, when the friction of the cards C with respect to the conveying member described further below is small, the friction is increased preferably by putting a weight on the card at the top or pressuring with a spring force or the like.

Next, the card dispensing means 104 is described. The card dispensing unit 104 has a function of dispensing a card stacked on the card holding unit 102 one by one from a bottom end in a predetermined direction. In the present embodiment, the card dispensing unit 104 includes frame unit 142, a conveying member 144, loop movement unit 146, drawing unit 148, and prime motor unit 150.

Figure 3:
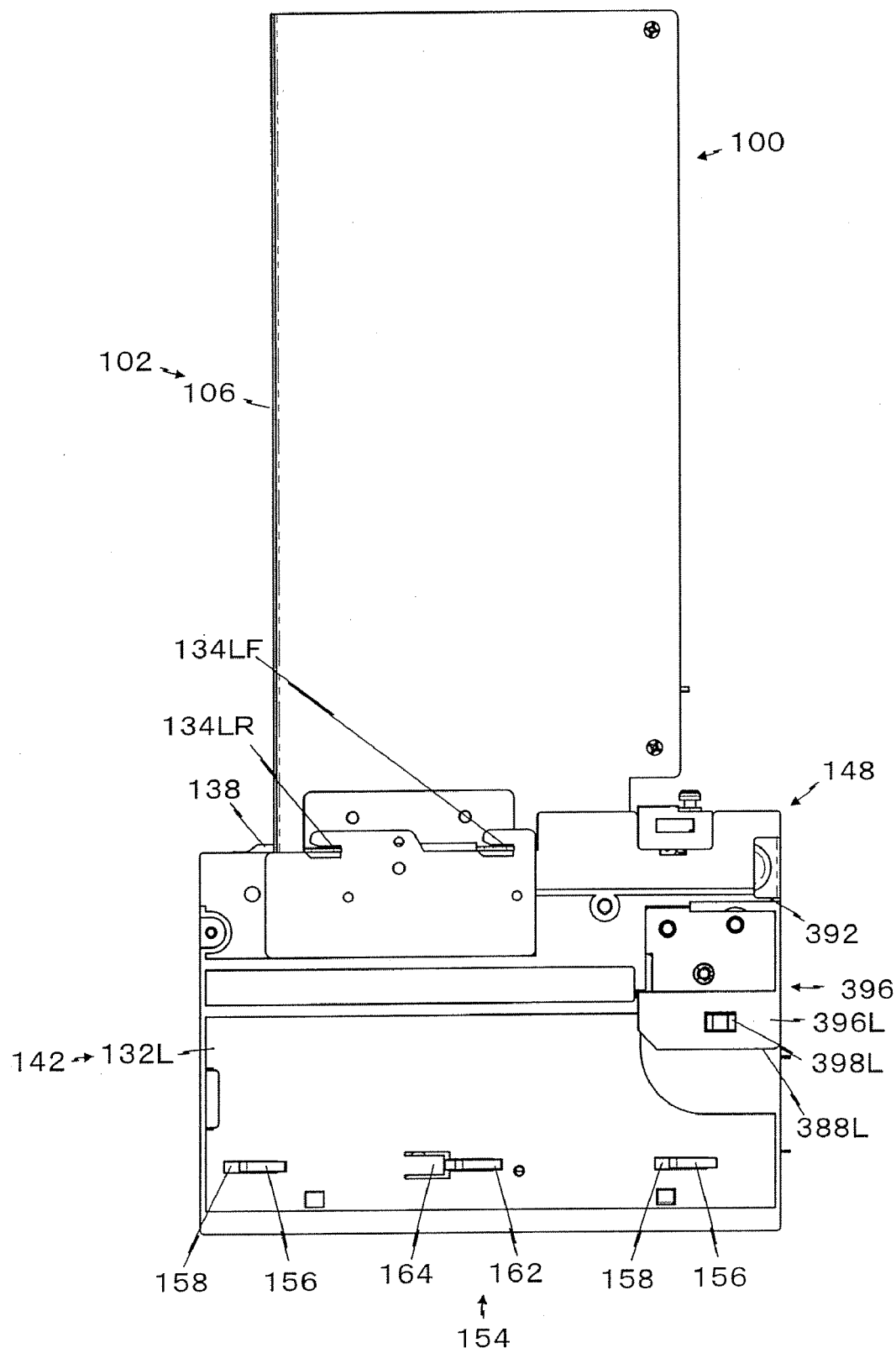
FIG. 3 is a left-side view of the card dispensing apparatus according to the first embodiment.
Figure 4:
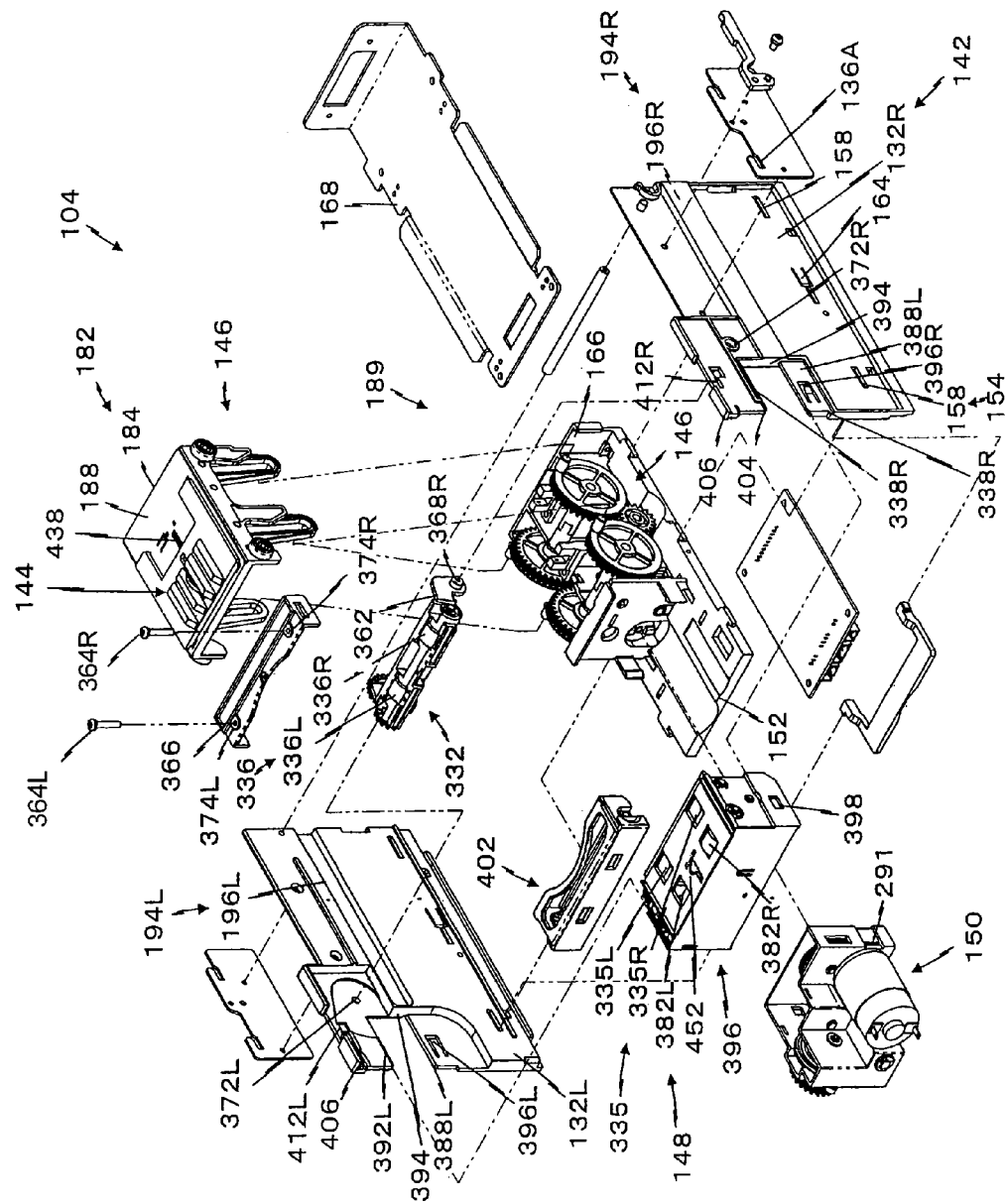
FIG. 4 is an exploded perspective view of dispensing means of the card dispensing apparatus according to the first embodiment.

First, the frame unit 142 is described as shown in FIGS. 3 and 4. The frame unit 142 is a cabinet having mounted thereon flat loop movement unit 146, the drawing unit 148, and the prime motor unit 150, and is formed in a channel shape in cross section with a bottom plate 152, a left side plate 132L, and a right side plate 132R that are each in a portrait-oriented rectangular shape.

In detail, the bottom plate 152 and the left side plate 132L and right side plate 132R are decomposably connected together via connecting unit 154. The connecting unit 154 includes hooks 156 formed at right and end faces at the front and rear of the bottom plate 152, rectangular engaging holes 158 formed at bottom portions of the left side plate 132L and the right side plate 132R so as to face the hooks 156, protrusions 162 formed at the center of the respective side surfaces of the bottom plate 152, and elastic engaging strips 164 each capable of engaging with the relevant one of the protrusions 162.

After inserting each hook 156 in the relevant engaging hole 158, sliding is performed in a rear direction (right direction in FIG. 3), thereby causing the outer surfaces of the left side plate 132L and the right side plate 132R to engage with the hooks 156. With the protrusion 162 engaged with the tip of the elastic engaging strip 164, the left side plate 132L and the right side plate 132R are prevented from sliding in a reverse direction, thereby being integrated with the bottom plate 152.

In this case, with a width regulating plate 166 perpendicularly standing upward from the bottom plate 152, the spacing between the left side plate 132L and the right side plate 132R is set to have a predetermined spacing. The bottom plate 152 can be fixed to a metal-made slide base 168 so as to be integrated together.

Figure 6:
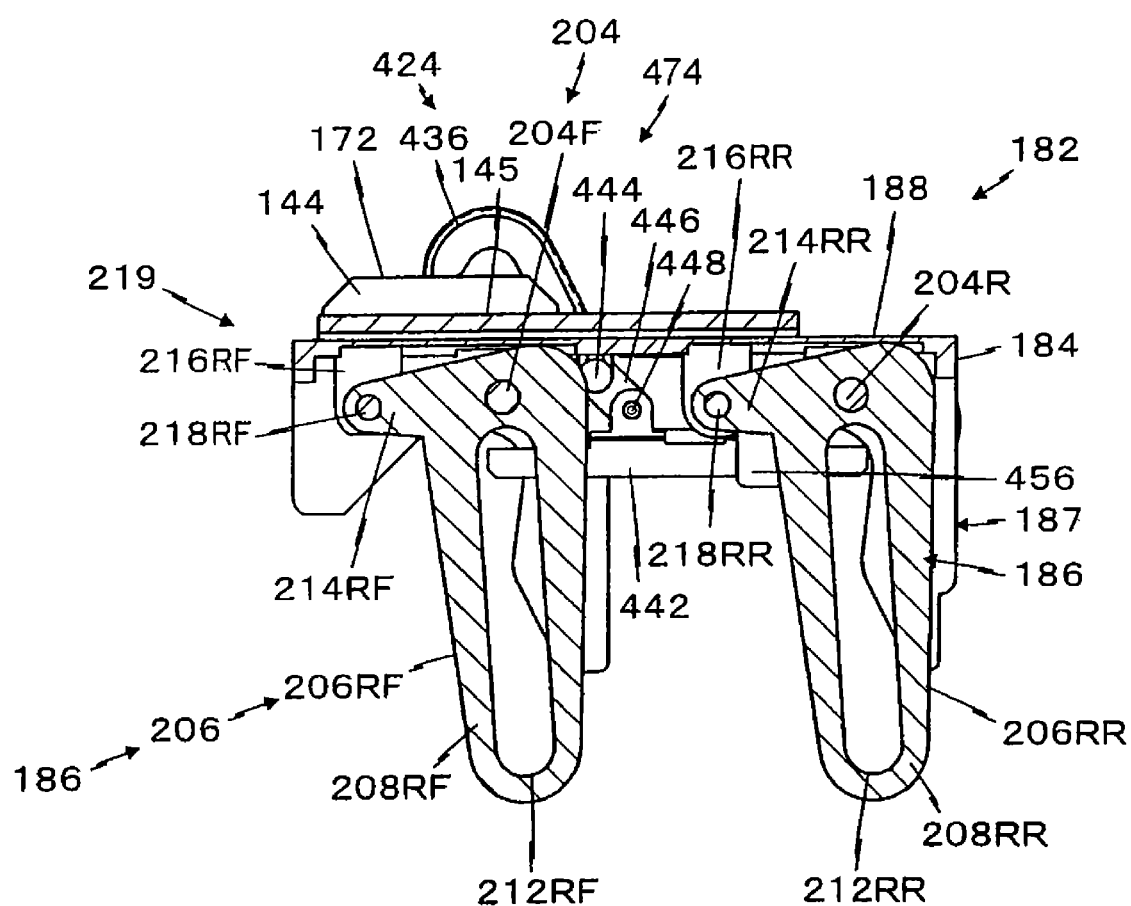
FIG. 6 is a cross sectional view of a conveying-member driving device taken along a B-B line in FIG. 7 near the most retracted position.

Next, the conveying member 144 is described as shown in FIGS. 4 and 6. The conveying member 144 makes a surface contact with the surface of the card C at an end portion of the card stack, and has a function of providing a driving force to the card with friction for dispensing in the dispensing direction. In the present embodiment, the conveying member 144 is formed of four rectangular stick-like members that are portrait-oriented with a predetermined width, are formed of soft rubber, which is a high-friction element, and are disposed in parallel.

In other words, the conveying member 144 has a flat contact surface 172 at its top end, the surface making a surface contact with the surface of the card. The conveying member 144 preferably has a hardness lower than the material of the cards so as not to damage the cards at the time of occurrence of sliding with respect to the cards. However, when the cards are made of paper, since such cards have an extremely low hardness, soft rubber having a hardness close to that of paper is preferably selected.

The conveying member 144 is fixed, in parallel, onto the upper surface of the holding member 145, which is a flat plate, with adhesion or the like, and is configured so as to be able to integrally move. The conveying member 144 can be made as one member through molding with a wide width or, conversely, the number of members of the conveying member 144 can be increased. The conveying member 144 can advance to the holding room 114 by passing through the opening 124 formed so as to face the base 116 of the card holding unit 102.

Next, the flat loop movement unit 146 is described. The flat loop movement unit 146 has a function of causing the conveying member 144 to make a flat loop movement. In detail, the flat loop movement unit 146 has a function of causing the conveying member 144 to advance into the opening 124 from a predetermined advancing position to make a surface contact with the surface of the card C, then linearly move in a predetermined direction, e.g. forward and horizontal while maintaining the card contact state, then retract from the elongated opening 124 to a lower retract position, and then move back to the initial advancing position while maintaining its retracted state.

The flat loop movement unit 146 includes a reciprocating member 182 that linearly reciprocates in the card dispensing direction and moves in a direction orthogonal to the dispensing direction. The reciprocating member 182 of FIG. 6 includes a first reciprocating member 184 that linearly reciprocates in the card dispensing direction, a second reciprocating member 186 that reciprocates in a direction forming a right angle with a moving direction of the first reciprocating member 184, relative-position holding unit 187 that holds the position of the second reciprocating member, and driving unit 189.

First, the first reciprocating member 184 is described. The first reciprocating member 184 has a function of providing the conveying member 144 with movements in the card dispensing direction and a return direction in reverse thereto.

In other words, the first reciprocating member 184 has a function of providing to the conveying member 144 linear movements in an upper dispensing direction and a lower reverse-dispensing direction of a flat loop movement.

The first reciprocating member 184 is formed so as to have an inverted U shape in cross section with a top table 188, a left side wall 192L hanging downward from the left side end of the top table 188, and a right side wall 192R hanging downward from the right side end thereof. The first reciprocating member 184 is guided by left guiding unit 194L and right guiding unit 194R so as to make linear movements in the card dispensing direction and its reverse direction.

The left guiding unit 194L includes a horizontally-extending left guiding groove 196L formed on an inner surface of the left side plate 132L and guide rollers 198LF and 198LR rotatably mounted at the front end and the rear end of the left side wall 192L and having the same diameter. These rollers 198LF and 198LR are inserted into the left guiding groove 196L, thereby being able to make a linear movement while being guided by this guiding groove 196L. The right guiding unit 194R includes a horizontally-extending right guiding groove 196R formed on an inner surface of the right side plate 132R and guide rollers 198RF and 198RR rotatably mounted at the front end and the rear end of the right side wall 192R and having the same diameter. These rollers 198RF and 198RR are inserted into the right guiding groove 196R, thereby being able to make a linear movement while being guided by this guiding groove 196R.

Next, the second reciprocating member 186 is described. The second reciprocating member 186 has a function of providing the conveying member 144 with movements in a direction of making contact with the surface of the card C and in a direction away therefrom. In other words, the second reciprocating member 186 has a function of giving to the conveying member 144 linear movements in an approaching direction to the card C and an anti-approaching direction in a flat loop movement. The second reciprocating member 186 is a lever 206 in an inverted-L shape mounted on a pivot shaft 204 so as to pivotally move.

In the present embodiment, the lever 206 includes L-shaped levers 206RF, 206RR, 206LF, and 206LR supported by pivot shafts 204F and 204R mounted at front ends of the left side wall 192L and the right side wall 192R of the first reciprocating member 184 so as to make a pivot movement, see FIG. 5. However, one lever 206 or a pair of left and right levers 206RF and 206RR can alternatively be configured as the lever 206.

The levers 206RF, 206RR, 206LF, and 206LR have first levers 208RF, 208RR, 208LF, and 208LR, respectively that approximately vertically stand and have formed thereon elongated holes 212RF, 212RR, 212LF, and 212LR, respectively. At the tips of second levers 214RF and 214RR (214LF and 214LR are not shown) of the levers 206RF, 206RR, 206LF, and 206LR, the second levers extending approximately in parallel to the top table 188, leg members 216RF, 216RR, 216LF, and 216LR extending downward from the holding member 145 through the opening of the top table 188 of the first reciprocating member 184 are supported by shafts 218RF, 218RR, 218LF, and 218LR so as to make a pivot movement.

With the second levers 214RF, 214RR, 214LF, and 214LR and the leg members 216RF, 216RR, 216LF, and 216LR, a four-joint parallel link mechanism 219 is formed as shown in FIG. 6. With this, the conveying member 144 is linearly reciprocated in a direction forming a right angle with respect to the dispensing direction of the first reciprocating member 184.

Figure 8:
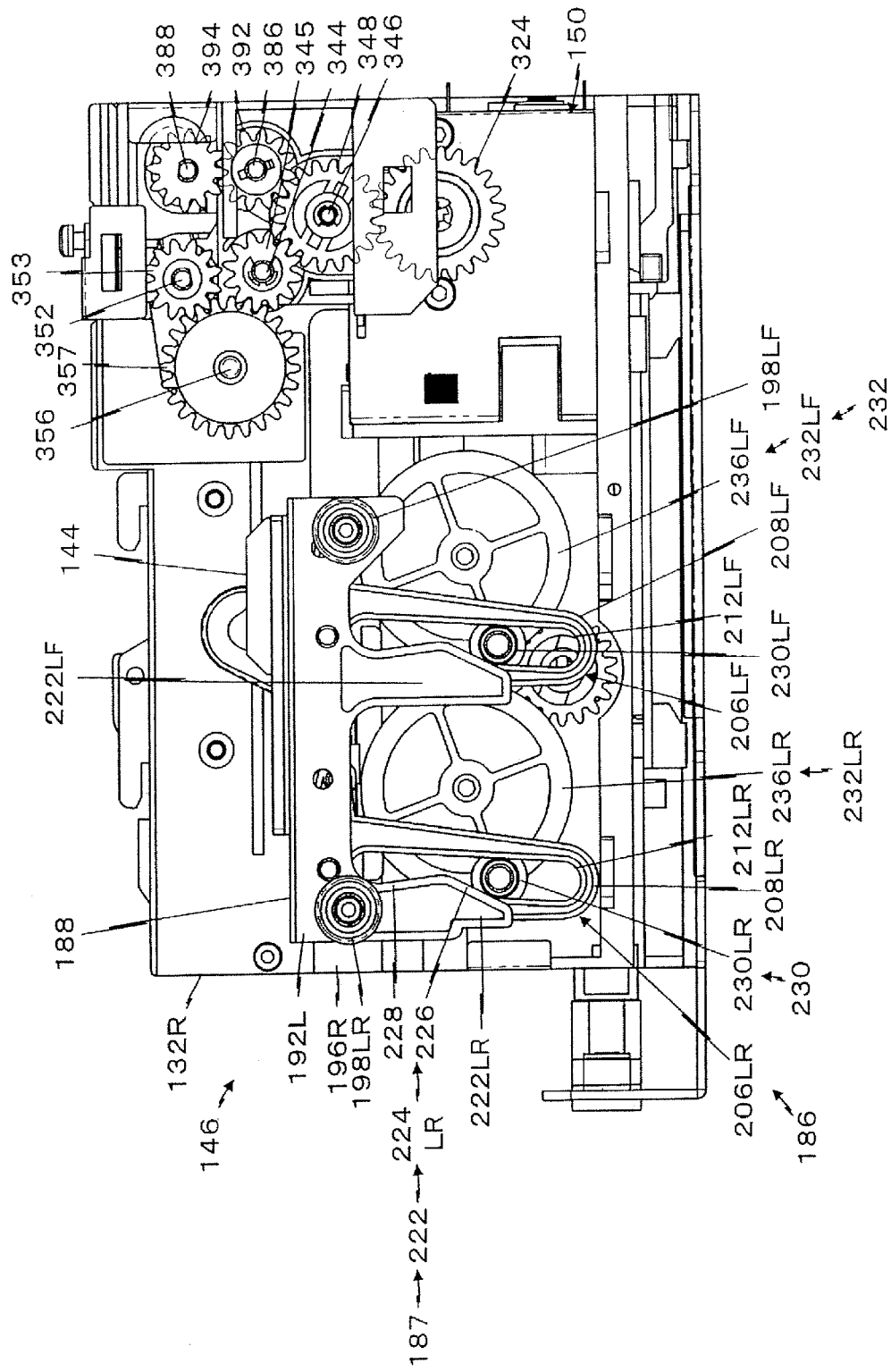
FIG. 8 is a side view of the card dispensing apparatus according to the first embodiment in a state where a left side plate is removed.
Figure 9:
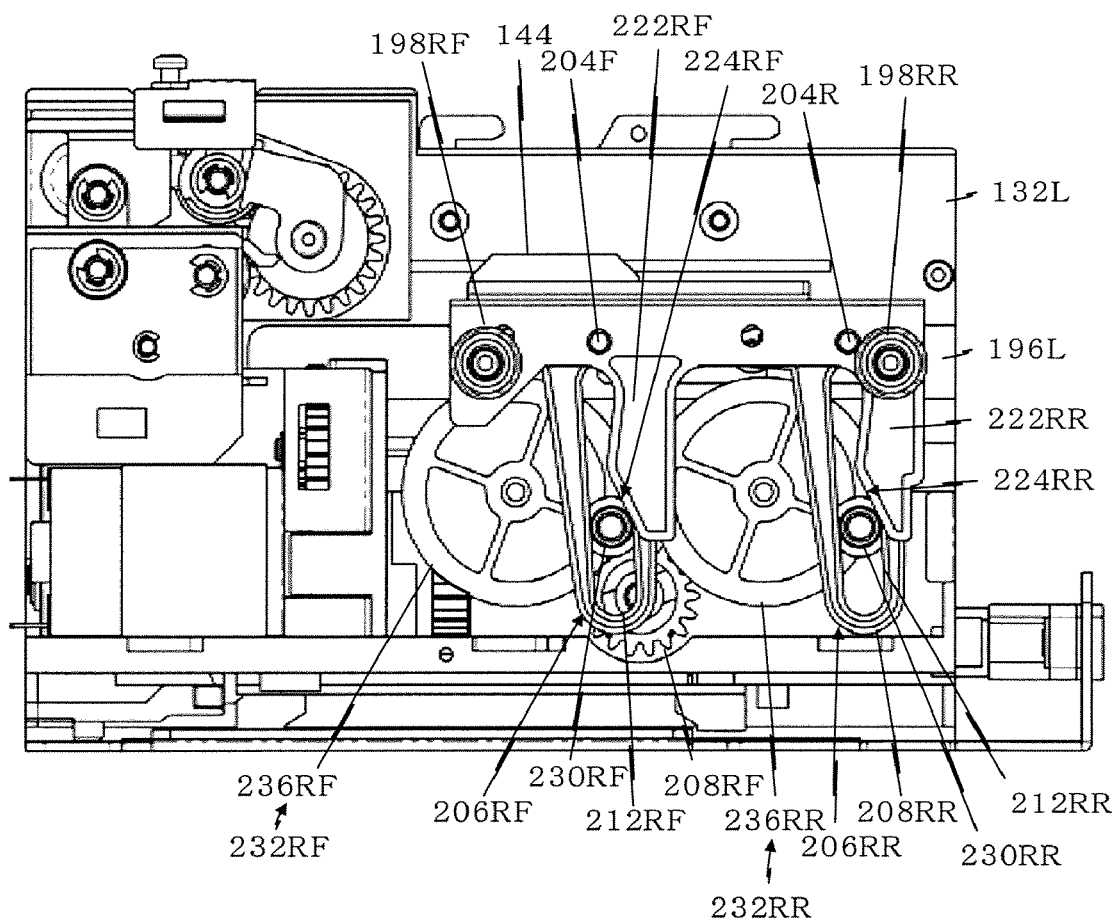
FIG. 9 is a side view of the card dispensing apparatus according to the first embodiment in a state where a right side plate is removed.

Next, the relative-position holding member 187 is described as shown in FIG. 8. The relative-position holding member 187 has a function of holding a relative position of the second reciprocating member 186 with respect to the first reciprocating member 184 at a predetermined positional relation while the first reciprocating member 184 makes a linear movement.

In the present embodiment, the relative-position holding member 187 is a cam 222 formed integrally with the first reciprocating member 184. The cam 222 is represented by plate cams 224RF, 224RR, 224LF, and 224LR formed on one side surface of cam protrusions 222RF, 222RR, 222LF, and 222LR extending downward external to and along the first levers 208RF, 208RR, 208LF, and 208LR from the left side wall 192L and the right side wall 192R.

Since the plate cams 224RF, 224RR, 224LF, and 224LR have the same configuration, the plate cam 224LR is described as a representative. The plate cam 224LR has formed thereon a first cam portion 226 formed at a lower end portion so as to be oriented rear-downward and a second cam portion 228 formed above a portion following the first cam portion so as to be oriented rear-upward. These first cam portion 226 and second cam portion 228 can make contact with crank pins 230RF, 230RR, 230LF, and 230LR, which will be described further below.

Specifically, when the crank pins 230RF, 230RR, 230LF, and 230LR make contact with the first cam portion 226, according to the rotation of the crank pins 230RF, 230RR, 230LF, and 230LR, the lever 206RF, 206RR, 206LF, and 206LR are rotated with respect to the first reciprocating member 184. Therefore, the conveying member 144 is moved in a direction of approaching or going away from the first reciprocating member 184.

When the crank pins 230RF, 230RR, 230LF, and 230LR make contact with the second cam portion 228, even if the positions of the crank pins 230RF, 230RR, 230LF, and 230LR are changed, the phase of the second reciprocating member 186 with respect to the first reciprocating member 184 is kept constant. In other words, even when the crank pins 230RF, 230RR, 230LF, and 230LR are rotated, the relative position of the conveying member 144 with respect to the first reciprocating member 184 is set so as not to be changed.

With the above configuration, the stroke in a flat lateral direction of the conveying member 144, in other words, in a dispensing direction and an anti-dispensing direction of the cards C, is determined by a rotation diameter of the crank pins 230RF, 230RR, 230LF, and 230LR. This stroke is set so that, even if the tip of the card C of the bottom end reaches immediately near the sides of the rollers 382 and 384 of feeding unit 334, which will be described further below, the conveying member 144 advances into the opening 124 again to make contact with only the card C at the bottom. This is because only the card C is to be dispensed.

Figure 10:
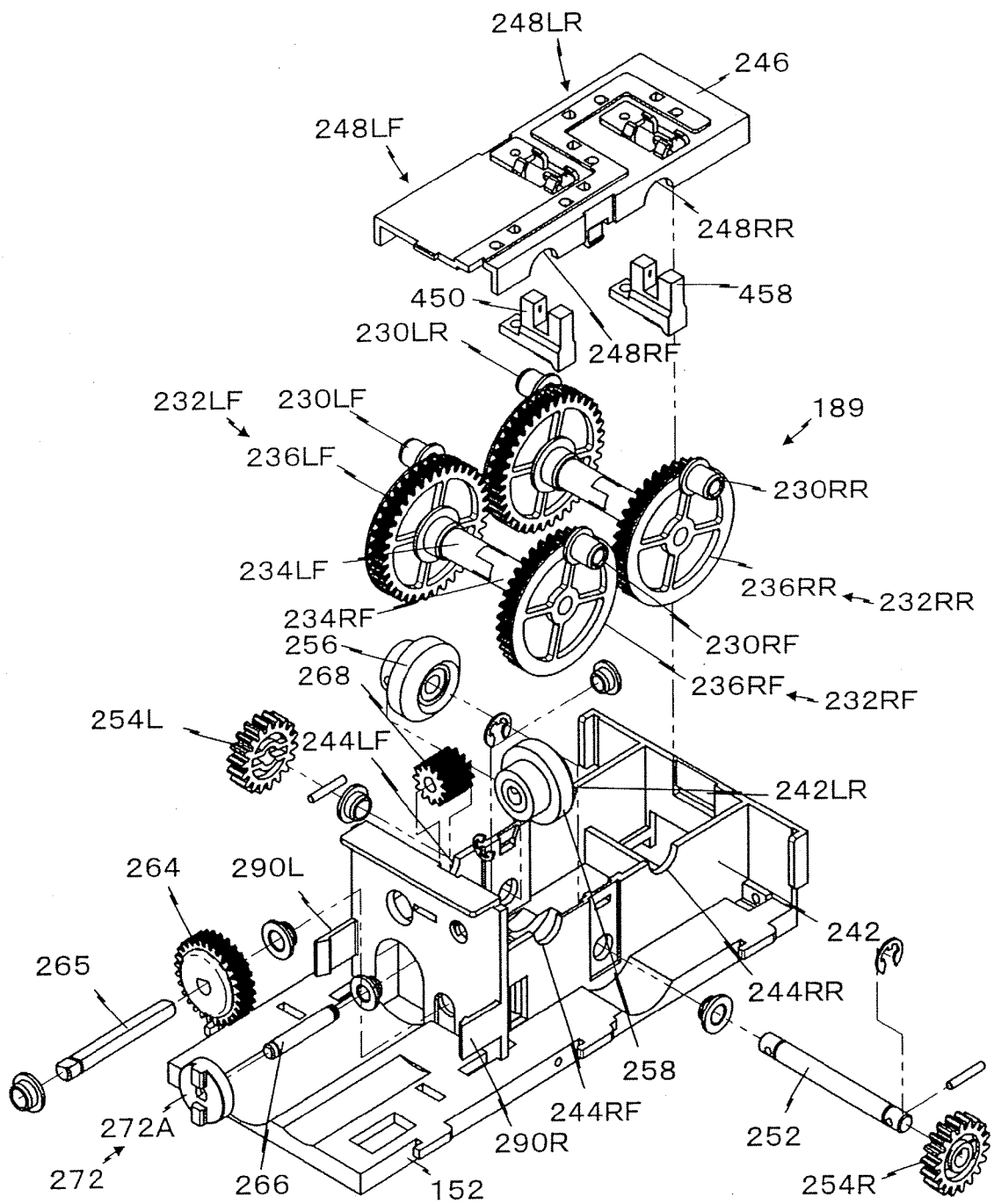
FIG. 10 is an exploded perspective view of the conveying-member driving device of the card dispensing apparatus according to the first embodiment.
Figure 11:
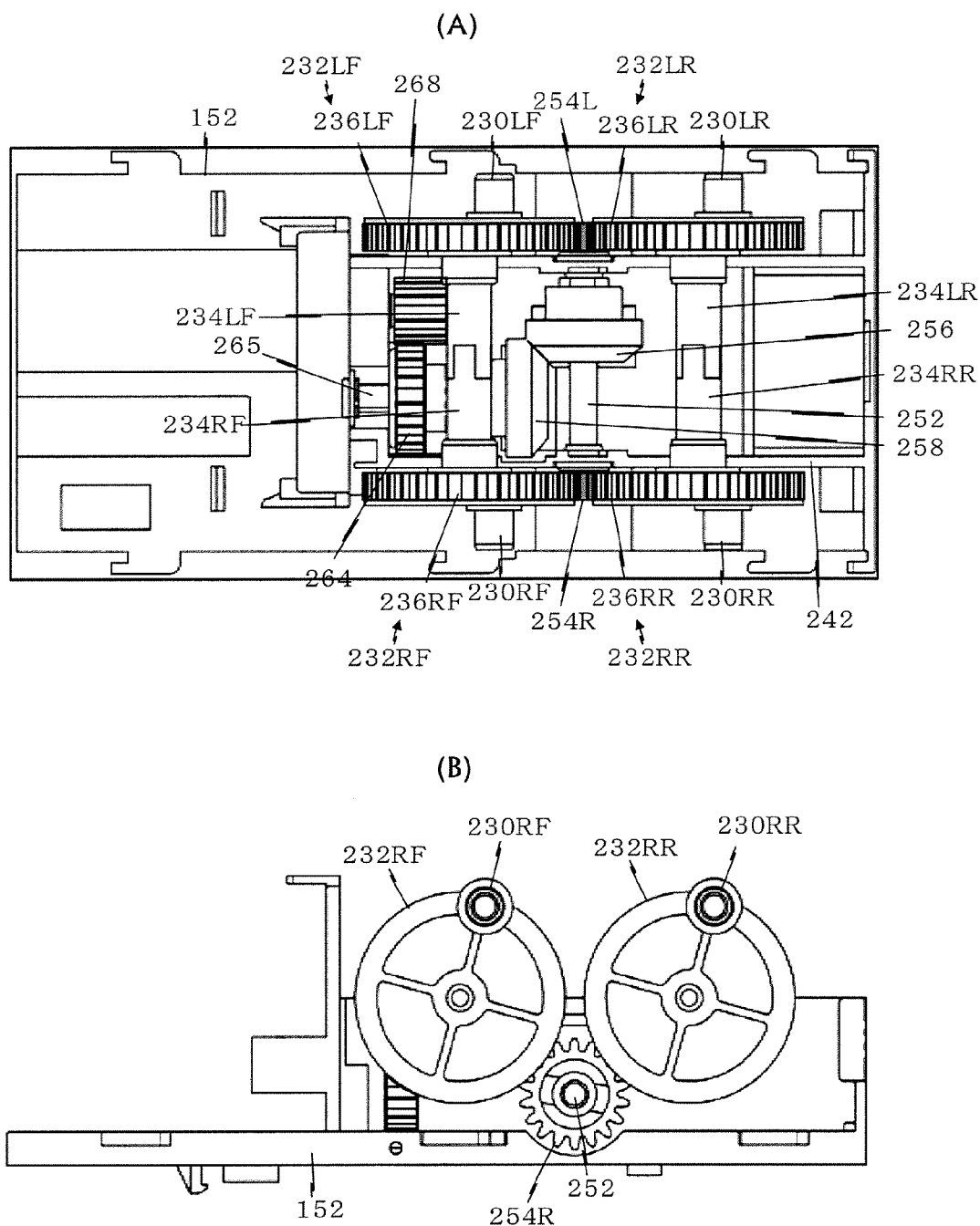
FIG. 11 depict a plan view and a side view of a crank device of the conveying-member driving device of the card dispensing apparatus according to the first embodiment.

Next, the driving unit 189 is described as shown in FIGS. 10 and 11. The driving unit 189 has a function of driving the flat loop movement unit 146. The driving unit 189 includes a crank 232 and a crank pin 230 mounted at a predetermined diameter position of the crank 232.

In the present embodiment, as the crank 232, cranks 232RF, 232RR, 232LF, and 232LR are provided that face the L-shape levers 206RF, 206RR, 206LF, and 206LR and have the same radius. The cranks 232RF and 232LF are gears 236RF and 236LF formed at end faces of rotating shafts 234RF and 234LF. Engaged and connected with the end faces of the rotating shafts 234RF and 234LF, the cranks 232RF and 232LF are integrated together.

With such a configuration, the cranks 232RF and 232LF can be configured with the same resin molded product and manufactured at a low cost. Similarly, the crank 232RR and 232LR are gears 236RR and 236LR formed at end faces of rotating shafts 234RR and 234LR and, engaged and connected with the end faces of the rotating shafts 234RR and 234LR, the cranks 232RR and 232LR are integrated together.

The crank pins 230RF, 230RR, 230LF, and 230LR are mounted on externally-oriented end surfaces of the gears 236RF, 236LF, 236RR, and 236LR. In the present embodiment, the crank pins 230RF, 230RR, 230LF, and 230LR are rollers. This is to reduce a driving force and improve durability.

The rotating shafts 234RF, 234LF, 234RR, and 234LR are inserted into semicircular bearing grooves 244RF, 244LF, 244RR, and 244LR, respectively, formed at an upper end of a box-shaped driving-member frame 242, and are covered with semicircular bearing grooves 248RF (248LF is not shown) and 248RR (248LR is not shown) of a holding member 246 from above so as to be rotatably held. The driving-member frame 242 is resin-molded integrally with the bottom plate 152.

Thus, the driving-member frame 242, in other words, the driving unit 189, is disposed between the left cranks 232LF and 232LR and the right cranks 232RF and 232RR. Between the bearing grooves 244RF and 244LF and between the bearing grooves 244RR and 244LR of the driving-member frame 242, a rotating shaft 252 is rotatably supported that has both ends to which pinion gears 254L and 254R engaged with the gears 236LF and 236LR and the gears 236RF and 236RR, respectively, are fixed. The crank pins 230RF, 230RR, 230LF, and 230LR are set at the same phase.

Therefore, at the time of a forward rotation, the gears 236LF and 236LR are rotated by the pinion gear 254L and the gears 236RF and 236RR are rotated by the pinion gear 254R in the same direction (in FIG. 5, a counter-clockwise direction). The crank pins 230RF, 230RR, 230LF, and 230LR are rotated in a clockwise direction in FIG. 5 with the same phase.

The crank pins 230RF, 230RR, 230LF, and 230LR are slidably inserted in the corresponding elongated holes 212RF, 212RR, 212LF, and 212LR, see FIG. 8. Thus, the second reciprocating member 186 is moved in the card dispensing direction and the anti-dispensing direction mainly with the movements of the crank pins 230RF, 230RR, 230LF, and 230LR in a right-left direction in FIG. 5. Via the pivot shafts 204F and 204R, the first reciprocating member 184 is provided with a linear reciprocating movement in the card dispensing direction and the anti-dispensing direction.

Also, the second reciprocating member 186 meets the first cam portion 226 at a predetermined timing in the course of rotation at the time of upward and downward rotation in FIG. 5 of the crank pins 230RF, 230RR, 230LF, and 230LR, and is rotated so that the relative position with respect to the first reciprocating member 184 is not changed. Furthermore, a contact is made with the second cam portion 228 at the time of moving in the dispensing direction of the first reciprocating member 184, and a rotation is made so as to go away and approach in a right-angle direction.

Thus, to the conveying member 144, a flat loop movement is given via the holding member 145 with the rotation movement of the crank pins 230RF, 230RR, 230LF, and 230LR. A first bevel gear 256 is fixed to an intermediate portion of the rotating shaft 252, see FIGS. 10 and 11(A), 11 (B). A second bevel gear 258 engaging with this first bevel gear 256 and a gear 264 fixed to a rotating shaft 265, which is the same rotating shaft as that of the second bevel gear 258, are incorporated in the driving-member frame 242. Thus, the rotating shaft 265 rotates about an axial line orthogonal to the rotating shaft 252.

To the driving-member frame 242, a rotating shaft 266 is mounted in parallel to the rotating shaft 265. To the rotating shaft 266, a pinion gear 268 engaging with the gear 264 is fixed. To an end face of the rotating shaft 266, one of clutch strips 272, that is, a clutch strip 272A, is integrally provided. Thus, since the driving unit 189 is disposed in a so-called dead space between the left crank pins 230LF and 230LF and the right crank pins 230RF and 230RR, the apparatus can be advantageously downsized.

Figure 12:
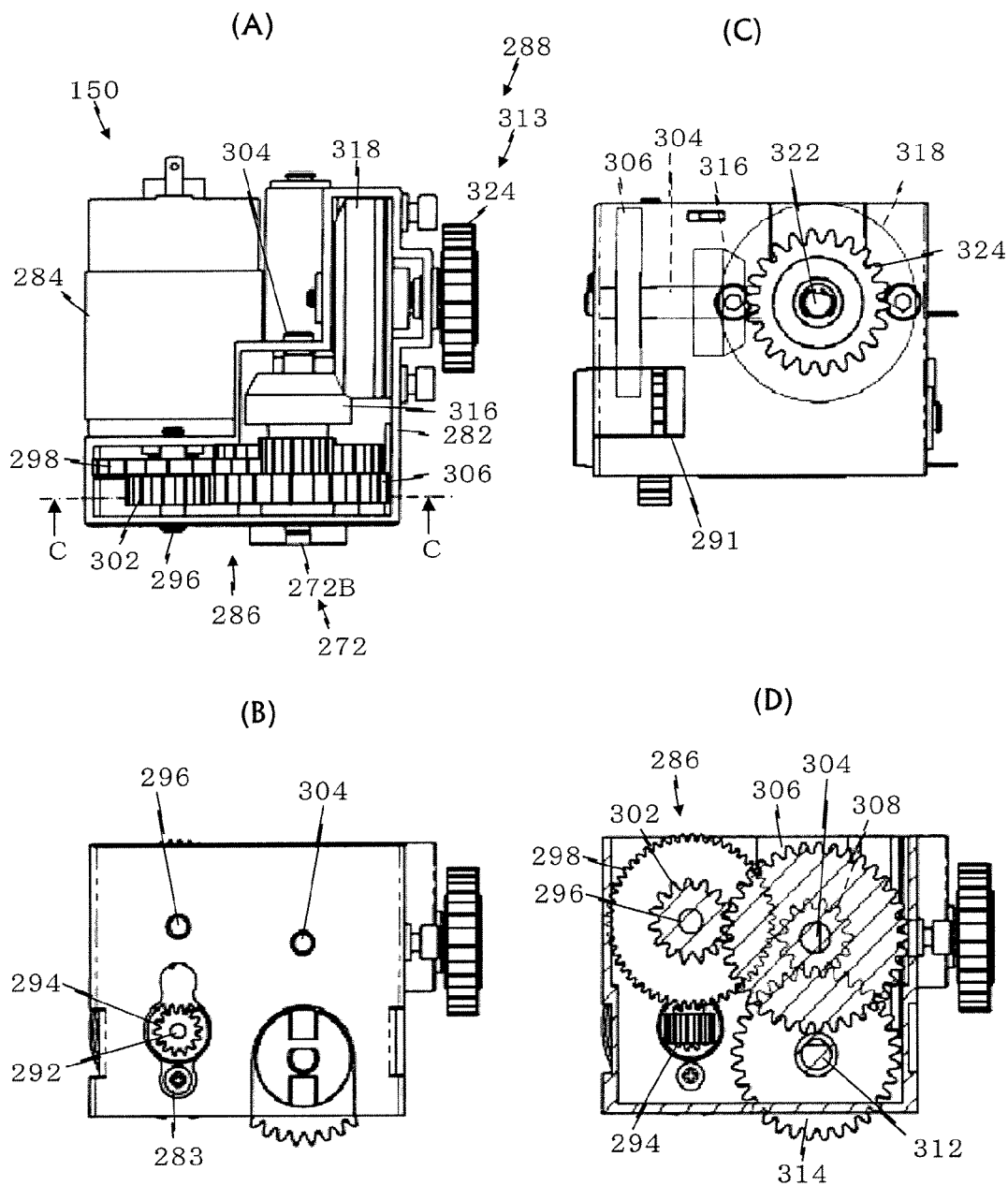
FIG. 12 depict a prime motor device of the conveying-member driving device of the card dispensing apparatus according to the first embodiment.

Next, the prime motor unit 150 is described mainly with reference to FIG. 12.

FIG. 12 (A) is a plan view of the driving unit 150, (B) is a rear view thereof, (C) is a left side view thereof, and (D) is a C-C cross sectional view. The prime motor unit 150 has a function of driving the driving unit 189 and the drawing unit 148. The prime motor unit 150 includes a casing 282 in an L shape when viewed in plane, an electric motor 284, a decelerating mechanism 286, and a driving device 288 of the drawing unit 148. The prime motor unit 150 is unitized by the casing 282, and is removably mounted by engaging with an engaging portion 291 of a casing 252 by using hooks 290L and 290R protruding from the end portions of the driving-member frame 242.

A driving pinion gear 294 is fixed to an output shaft 292 of the electric motor 284 fixed to the casing 282 with a screw 283. The driving pinion gear 294 engages with a gear 298 fixed to a rotating shaft straight above. An adjacent gear 302 fixed to the rotating shaft 296 engages with a gear 306 fixed to a rotating shaft 304 disposed in parallel to the rotating shaft 296. A gear 308 fixed adjacently to the gear 306 engages with a gear 314 fixed to a rotating shaft 312 disposed below the rotating shaft 304 and on a side of the gear 294. To an end face of the rotating shaft 312, the other one of clutch strips 272, that is, a clutch strip 272B, is fixed.

When the prime motor unit 150 is fixed to the driving-member frame 242, the clutches 272A and 272B are engaged with each other. Therefore, the rotation of the electric motor 284 is transferred to the gear 268 via the output shaft 292, the driving pinion gear 294, the gear 298, the rotating shaft 296, the gears 302 and 306, the gears 304, the gears 308 and 314, the rotating shaft 312, and the clutches 272.

Next, the driving device 288 is described. The driving device 288 has a function of driving the drawing unit 148 that draws the card C dispensed by the flat loop movement unit 146. The driving device 288 is a gear mechanism 313. In the gear mechanism 313, a bevel gear 316 fixed to the rotating shaft 304 is fixed to a bevel gear 318. The bevel gear 318 is engaged with a rotating shaft 322. A gear 324 is fixed to the tip protruding from the casing 282 of the rotating shaft 322.

Next, the drawing unit 148 is described. The drawing unit 148 has a function of drawing one of the cards C dispensed by the flat loop movement unit 146. In the present embodiment, the drawing unit 148 includes two-sheet drawing preventing unit 332 and feeding unit 334.

Figure 13:
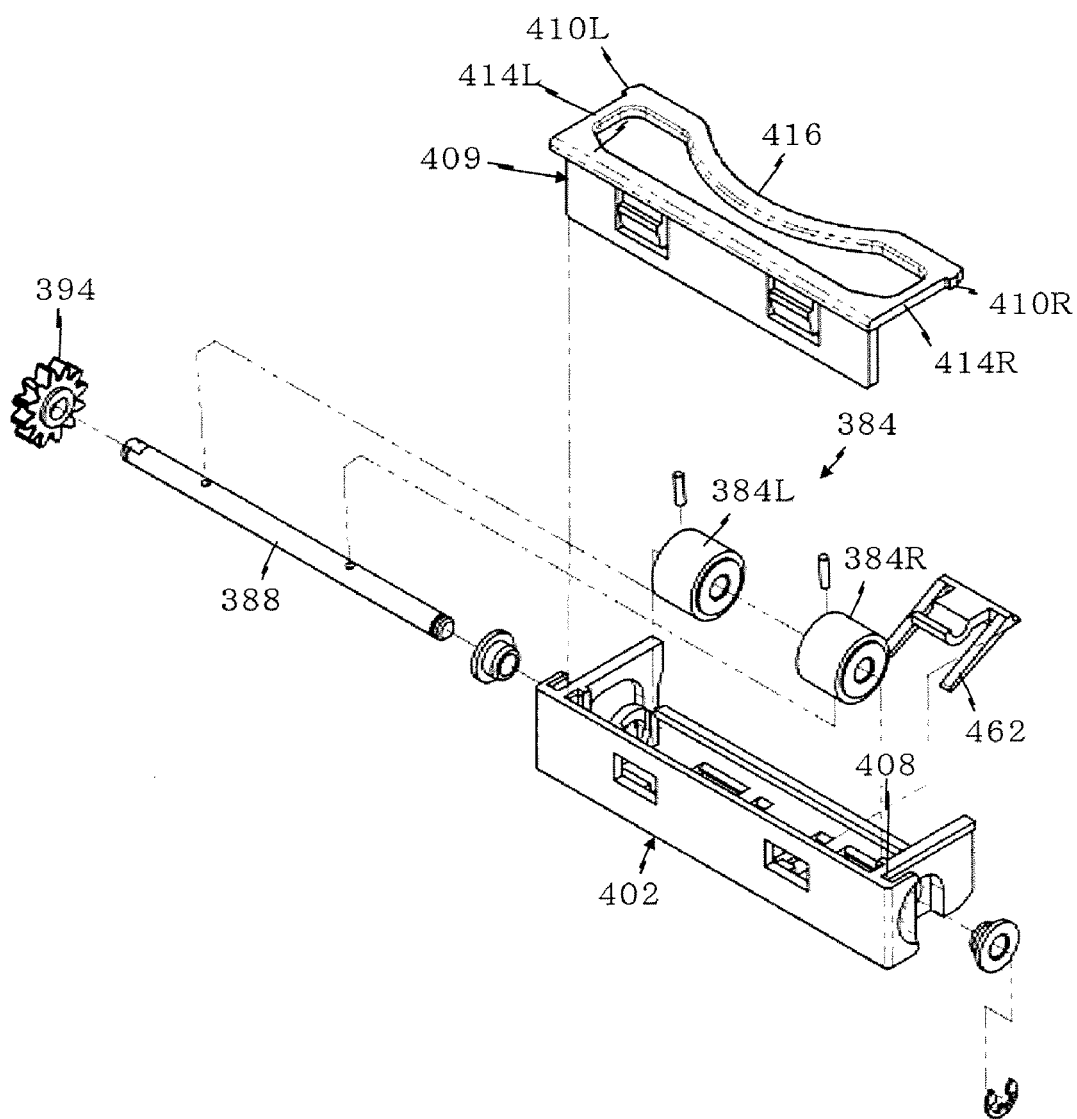
FIG. 13 is an exploded perspective view of a drawing device of the card dispensing apparatus according to the first embodiment.

First, the two-sheet drawing preventing unit 332 is described, see FIGS. 4 and 13. The two-sheet drawing preventing unit 332 has a function of allowing only one card at the end to pass when cards are dispensed by the conveying member 144 as being stacked. Thus, this unit can be changed to another device having a similar function.

The two-sheet drawing preventing unit 332 is disposed near the side of the exit 122 and includes a roller 335, a reverse-rotation roller 336, and spacing adjusting unit 338.

Next, the roller 335 is described. The roller 335 is disposed on a lower side of a card passage 342, which is an extension line of the exit 122, and loosely fits to a rotating shaft 344. In the present embodiment, the roller 335 includes two rollers 335L and 335R disposed so as to be spaced in a card width direction, and these rollers are molded from resin. The rollers 335 are rotatable with respect to the rotating shaft 344. A rotating shaft 344 has fixed at its end a gear 345 engaging with an intermediate gear 348 rotatably supported from the gear 324 to a shaft 326, thereby being driven for rotation.

Next, the reverse-rotation roller 336 is described. The reverse-rotation roller 336 is disposed on an upper side of the card passage 342 so as to face the roller 335, and is rotated so that a facing perimeter surface moves to an opposite side to the dispensing direction of the cards C. Furthermore, the spacing between the roller 335 and the reverse-rotation roller 336 is set so as to be longer than the thickness of the card and shorter than the thickness of two cards, thereby preventing the reverse-rotation roller 336 from dispensing two cards in stack.

In more detailed description, when two cards C advance as being stacked, the reverse-rotation roller 336 acts so as to press back the end face of the card on the upper side, and only the card in contact with the roller 335 passes between the roller 335 and the reverse-rotation roller 336. The reverse-rotation roller 336 is fixed to a rotating shaft 352, is excellent in resistance to abrasion, and is molded from soft rubber having a predetermined coefficient of friction. In the embodiment, the reverse-rotation roller 336 has a gear 353 fixed to the roller 335 engaging with a gear 345 fixed to a shaft 344 via a gear 357 rotatably supported from a gear 356, thereby being driven for rotation.

Next, the spacing adjusting unit 338 is described, see FIG. 5. The spacing adjusting unit 338 has a function of adjusting the spacing between an upper end of the perimeter surface of the roller 335 and a lower end of the perimeter surface of the reverse-rotation roller 336 so that the spacing is longer than the thickness of one card and is shorter than the thickness of two cards.

Figure 7:
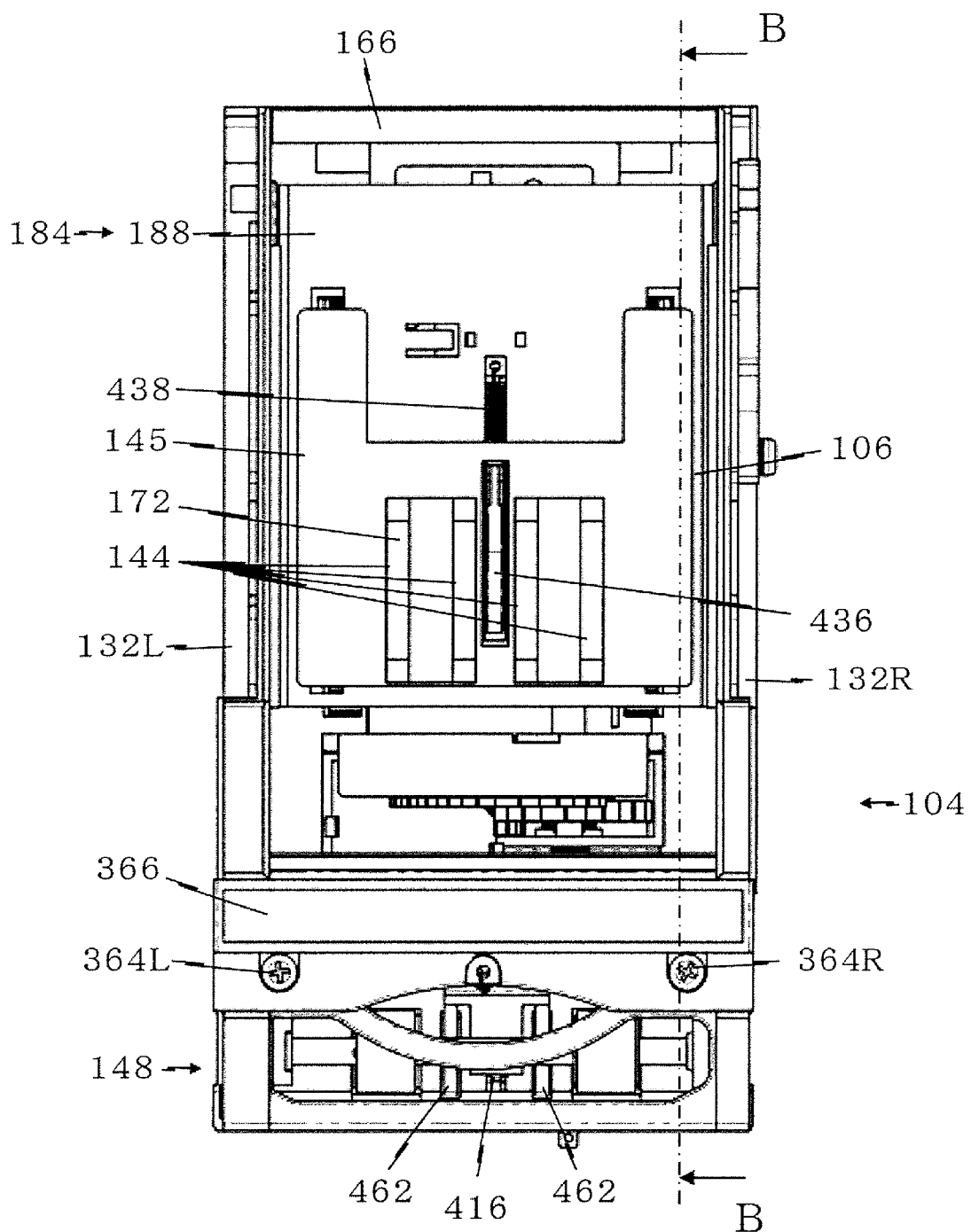
FIG. 7 is a plan view of the card dispensing apparatus according to the first embodiment in a state where a card cassette is removed.

In the present embodiment, the spacing adjusting unit 338 includes a rocking member 362 that supports the rotating shaft 352 of the reverse-rotation roller 336, screws 364L and 364R as adjusting unit, and screw-hole plate 366 having screw holes 374L and 374R for screwing screws 364L and 364R, see FIG. 7. The rocking member 362 has a gate shape in an inverted L shape when viewed from the side, and has shafts 368L and 368R protruding from both ends to the sides, the shaft 368L being rotatably inserted into a shaft hole 372L of the left side plate 132L and the shaft 368R being rotatably inserted into a shaft hole 372R of the right side plate 132R, see FIG. 4.

The screw-hole plate 366 fixes the right end to the left side plate 132L and the left end to the right side plate 132R, and is disposed with a predetermined spacing above the rocking member 362. The screw holes 374L and 374R extending in an upward and downward direction are formed at left and right end portions of the screw-hole plate 366, respectively, and have inserted therein the screws 364L and 364R, respectively. The tips of the screws 364L and 364R are struck on an upper end face of the rocking member 362. The rocking member 362 is pressed by a spring 376 hung in a space formed with the screw-hole plate 366, in a direction in which the reverse-rotation roller 336 goes away from the roller 335.

When the screws 364L and 364R are screwed tight, the rocking member 362 can be rotated by a subtle amount, thereby causing the reverse-rotation roller 336 to come close to the roller 335 by a subtle amount. Therefore, with the screws 364L and 364R being screwed or loosened, the distance between the lower end of the perimeter surface of the reverse-rotation roller 336 and the upper end of the perimeter surface of the roller 335 can be adjusted so as to be longer than the thickness of one card and shorter than the thickness of two cards. With this, only one card C can pass through the gap between the roller 335 and the reverse-rotation roller 336.

Next, the feeding unit 334 is described. The feeding unit 334 has a function of further advancing the card that has passed through the two-sheet drawing preventing unit 332 in the dispensing direction. Thus, the feeding unit 334 can be changed to another unit having a similar function.

In the present embodiment, the feeding unit 334 includes a pair of rollers 382 and 384 disposed on an upside and a downside. The roller 382 is disposed on a lower side of the card passage 342, and is fixed to a rotating shaft 386, see FIG. 5. The roller 384 is disposed on an upper side of the card passage 342 so as to face the roller 382, and is fixed to a rotating shaft 388. The rollers 382 and 384 are molded from soft rubber, and are set so that the perimeter surfaces of the rollers 382 and 384 normally make a light contact with each other.

A gear 392 fixed to an end portion of the rotating shaft 386 engages with an intermediate gear 348. The gear 392 engages with a gear 394 fixed to an end portion of the shaft 388. Thus, the roller 382 is rotated by the gear 348 in a forward rotating direction, which is the card dispensing direction.

The roller 384 is rotated from the gear 392 via the gear 394 and the shaft 388 in the forward rotating direction, which is the card dispensing direction, see FIG. 13. When a card is dispensed, the rollers 382 and 384 are elastically deformed to nip the card from upper and lower sides, thereby dispensing the card. In the present embodiment, the roller 384 includes rollers 384L and 384R disposed with a predetermined spacing.

The shaft 346, the rotating shaft 344 of the roller 335, and the shaft 386 of the roller 382 are preferably mounted on a first bearing member 396 in one box shape for unitization, thereby facilitating assembly and roller replacement.

In the present embodiment, lower-side guide edges 388L and 388R and upper-side guide edges 392L and 392R horizontally extending from the side end portions of the front surface are formed on inner surfaces of the left side plate 132L and the right side plate 132R of the frame unit 142 facing each other, and are connected together by a vertically-standing stop edge 394. A bottom surface and an upper surface of each of right and left end portions of the first bearing member 396 are pressed into along the lower-side guide edges 388L and 388R and the upper-side guide edges 392L and 392R to be pressed onto the stop edge 394.

In this state, since stoppers 396L and 396R formed integrally with the left side plate 132L and the right side plate 132R in a cantilevered state face each other, the first bearing member 396 is fixed to the frame unit 142 by being hung on a protrusion 398 on a side surface of the first bearing member 396. The rollers 382 and 384 are set to have the same circumferential velocity, which is set at a velocity twice to six times faster than a moving velocity of the dispensing direction of the conveying member 144.

The rotating shaft 388 of the roller 384 is mounted on a box-shaped second bearing member 402, see FIG. 13. The second bearing member 402 has a length that is set so as to allow a closely-contacted insertion between the left side plate 132L and the right side plate 132R. Also, a lower-side guiding thread 404 that guides a lower surface of the second bearing member 402 and an upper-side guiding thread 406 that guides an upper surface thereof are formed on the inner surfaces of the left side plate 132L and the right side plate 132R.

The second bearing member 402 is inserted between these lower-side guiding thread 404 and the upper-side guiding thread 406 to be slid so that the bottom of a portrait-oriented groove 408 at an end portion of the second bearing member 402 is struck onto end faces of the left side plate 132L and the right side plate 132R, thereby being positioned at a predetermined position. At this time, protrusions 410L and 410R formed at left and right end faces of a stopper 409 mounted integrally on the second bearing member 402 are engaged with end portions of engaging holes 412L and 412R of the left side plate 132L and the right side plate 132R, respectively, to be fixed thereto.

The stopper 409 has a rectangular ring shape made of resin, and only the portion on the front surface side is fixed to the second bearing member 402. Thus, side frames 414L and 414R can be elastically deformed. These side frames 414L and 414R are jointed together by a joint member 416. The joint member 416 is preferably curved so as to be easy to be hold by the tip of a finger.

When the second bearing member 402 is removed from the frame unit 142, a thumb is pressed onto the front end face of the second bearing member 402 and the index finger or another finger catches the joint member 416 for pulling to a front-end-face side. With this, the side frames 414L and 414R are elastically deformed to be moved inward, thereby causing the protrusions 408L and 408R to be removed from the engaging holes 412L and 412R. In this removed state, the second bearing member 402 can be removed from the frame unit 142 by drawing the second bearing member 402.

Figure 14:
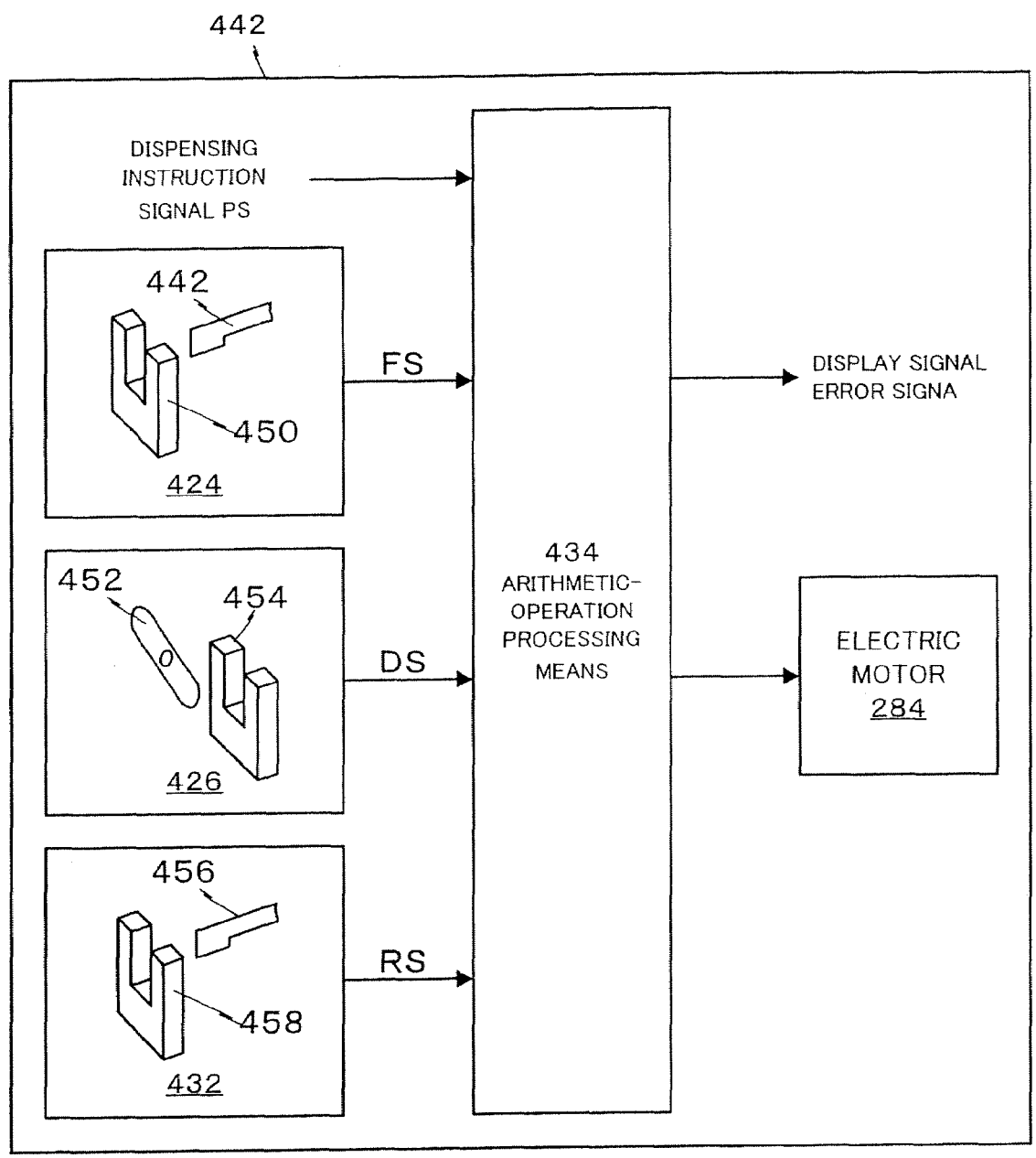
FIG. 14 is a block diagram of a control mean of the card dispensing apparatus according to the first embodiment.

Next, control unit 422 is described with regards to FIG. 14. The control unit 422 includes held-card detecting unit 424, card-dispensing detecting unit 426, most-retract-position detecting unit 432, arithmetic-operation processing unit 434, such as a microcomputer, and an electric motor 284.

First, the held-card detecting unit 424 is described. The held-card detecting unit 424 has a function of detecting the presence or absence of a card in the card holding unit 102. Thus, the held-card detecting unit 424 can be changed to another device having a similar function.

In the present embodiment, the held-card detecting unit 424 includes a first detecting member 436 mounted on the first reciprocating member 184, a spring 438 as pressing unit, and a first detection-target member 442 interlocked with the first detecting member 436, see FIG. 6. The first detecting member 436 is rotatably mounted on a shaft 444 of the first reciprocating member 184, has its upper end portion positioned on a side of the conveying member 144, and is provided by a spring 438 with a rotation force so as to be positioned above the conveying member 144.

The first detection-target member 442 is mounted at the tip of a lever 446 continued from the first detecting member 436 by a shaft 448 so as to be able to make a pivot movement. The lever 446 and the first detection-target member 442 form a part of a four-joint parallel link mechanism 444. Thus, the first detection-target member 442 is caused to approach and separated in a state parallel to the first reciprocating member according to a rocking movement of the first detecting member 436.

By a holding sensor 450 fixed to the holding member 246, this first detection-target member 442 is detected by the holding sensor 450 when the first detecting member 436 protrudes upward from the conveying member 144. With this detection, the holding sensor 450 outputs a no-card signal. In other words, when the first detection-target member 442 is not detected by the holding sensor 450, a holding signal FS is output.

Next, the card-dispensing detecting unit 426 is described. The card-dispensing detecting unit 426 has a function of detecting the presence of the card in the drawing unit 148. Thus, the card-dispensing detecting unit 426 can be changed to another device having a similar function. The card-dispensing detecting unit 426 includes a second detecting member 452 and a dispensing sensor 454.

The second detecting member 452 is pressed so that its upper end portion protrudes into the card passage 342 between the rollers 382L and 382R in the first bearing member 396. The dispensing sensor 454 is incorporated in the first bearing member 396, and outputs a card dispensing signal DS when the second detecting member 452 is pressed by a card into the first bearing member 396.

Next, the most-retracted-position detecting unit 432 is described. The most-retracted-position detecting unit 432 has a function of detecting the most retracted position of the conveying member 144. Thus, the most-retracted-position detecting unit 432 can be changed to another device having a similar function.

The most-retracted-position detecting unit 432 includes a second detection-target member 456 protruding downward from the first reciprocating member 184, and a most-retract-position sensor 432. The second detection-target strip 456 is detected by the most-retract-position sensor 432 fixed to the holding member 246 when the first reciprocating member 184 is positioned near the most retract position. At this time, the most-retract-position sensor 432 outputs a most-retract-position signal RS.

Next, the arithmetic-operation processing unit 434 is described. The arithmetic-operation processing unit 434 is, for example, a microcomputer, receiving a detection signal from the holding sensor 450, the dispensing sensor 454, and the most-retract-position sensor 432 based on a program stored in a ROM, performing a predetermined process to turn the electric motor 284 ON/OFF, and outputting a predetermined signal, such as a display signal, to an external processing device.

Here, a card holding member 462 is preferably mounted on the second bearing member 402, see FIG. 7. The card holding member 462 has a function of holding the card C dispensed by the feeding unit 334 in the dispensing unit 104. Thus, when the card C falls down from the card dispensing unit 104, the card holding member 462 is not mounted.

The card holding member 462 is a protruding strip made of a elastic member, with its one end fixed to the second bearing member 402 and its tip making contact with the first bearing member 396 with a predetermined force. In the present embodiment, the card holding member 462 is disposed so that the second detecting member 452 is interposed from right and left, thereby also ensuring card detection.

Figure 15:
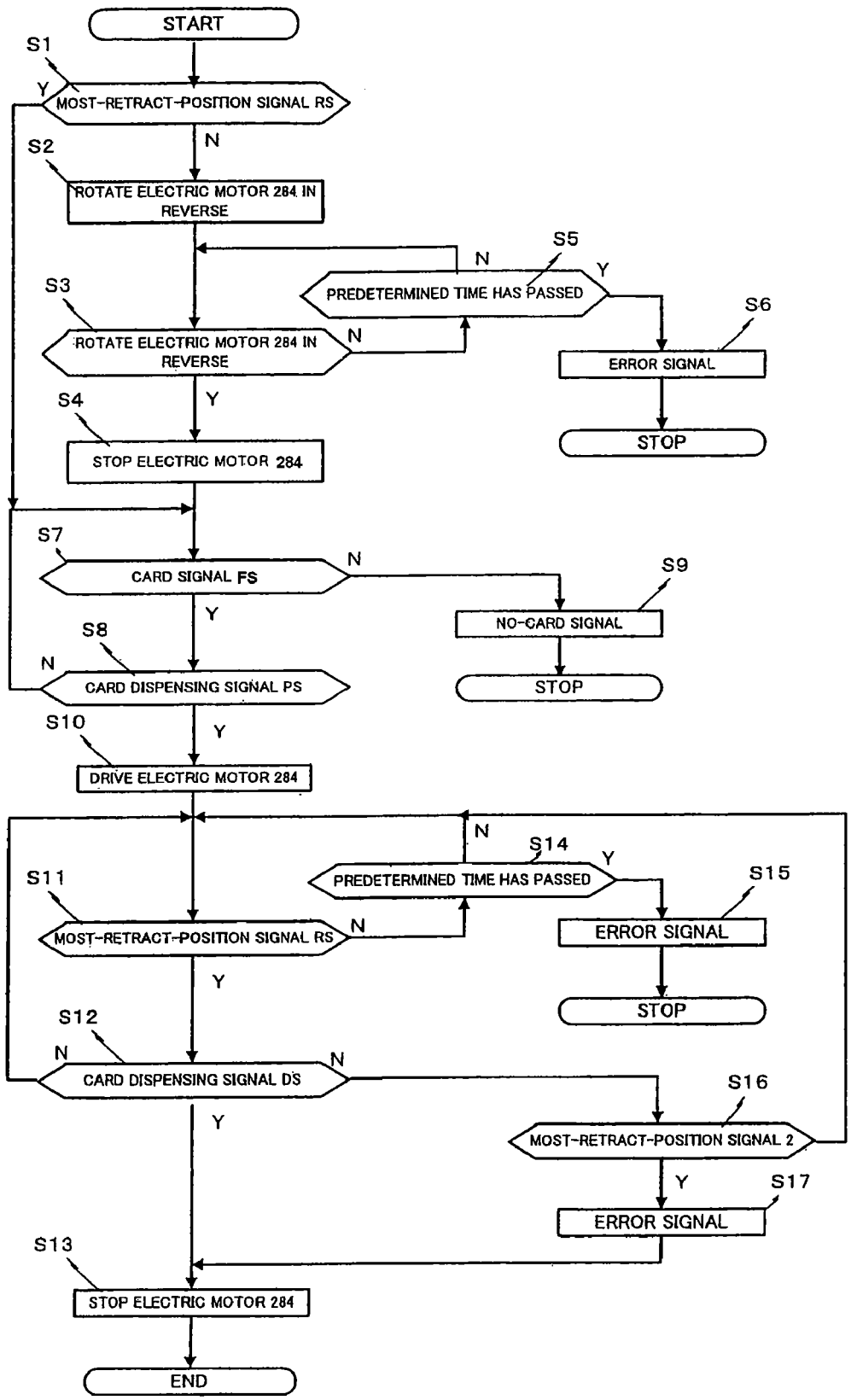
FIG. 15 is a flowchart for describing the operation of the card dispensing apparatus according to the first embodiment.

Next, also with reference to the flowchart of FIG. 15, the operation of the card dispensing apparatus according to the present embodiment is described.

First, prior to the operation of the card dispensing apparatus 100, the card holding unit 102 is removed from the card dispensing unit 104, and then the cards C are stacked in the holding room 114 of the holding member 106. In detail, by pressing the tip of the lock strip 138 downward, the engagement of protrusions 126LR and 126RR is released. Thus, the card holding unit 102 is shifted rearward (rightward in FIG. 3) to pull the protrusions 126RF, 126RR, 126LF, and 126LR from the corresponding engaging grooves 134RF, 134RR, 134LF, and 134RF, respectively. With this, the card holding unit 102 can be removed from the card dispensing unit 104.

Next, the lid 112 is opened, and then the cards C are stacked in the holding room 114 from the opening 108. In detail, the card at the bottom is supported by the base 116 and has stacked thereon the cards C in a columnar shape with their surfaces being closely contacted each other.

Next, after the opening 108 is closed with the lid 112, conversely to the above, the protrusions 126LF, 126LR, 126RF, and 126RR are placed on upper ends of the left side plate 132L and the right side plate 132R, and are then slid in a lateral direction, thereby being inserted into the engaging grooves 134RF, 134RR, 134LF, and 134LR. When the protrusions 126LF, 126LR, 126RF, and 126RR are struck on back walls of the engaging grooves 134RF, 134RR, 134LF, and 134LR, the lock strips 138L and 138R return upward by elasticity, thereby engaging with rear ends of the protrusions 126LR and 126RR and fixing the card holding unit 102 to the card dispensing unit 104.

Figure 16:
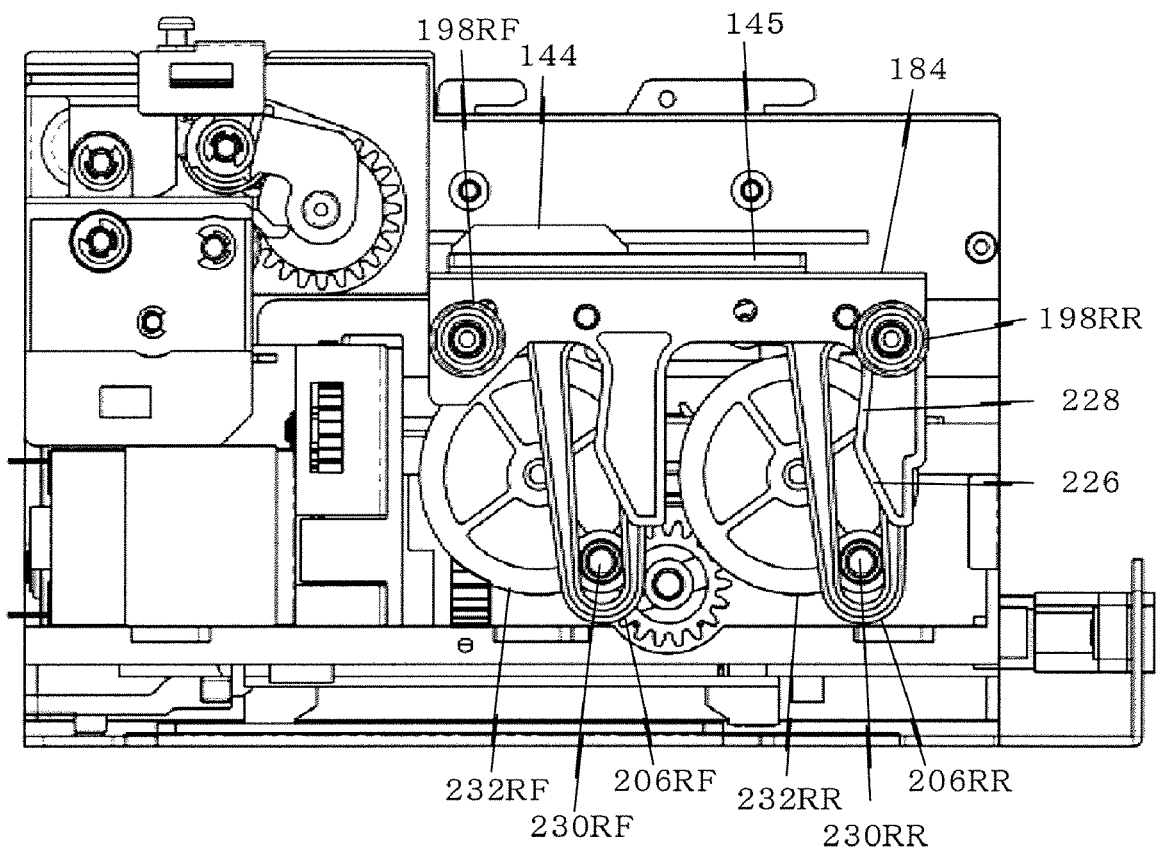
FIGS. 16-20 are drawings for describing the operation of the card dispensing apparatus according to the first embodiment.

Normally, the conveying member 144 is stopped near the most retract position (position depicted in FIG. 16). Therefore, the second detection-target member 456 is at a position where it is detected by the most-retract-position sensor 432.

When the card holding unit 102 is set, the first detecting member 436 passes through the opening 124B of the base 116 to advance into the holding room 114. Therefore, the first detecting member 436 is pressed toward the surface of the card C at the bottom end to be positioned slightly above the contact surface 172 of the conveying member 144. With this, in FIG. 6, the first detecting member 436 is rotated in a counterclockwise direction. Therefore, the first detection-target member 442 is raised upward, and is not detected by the holding sensor 450. The holding sensor 450 then outputs a holding signal FS.

First, at step S1, it is determined whether a most-retract-position signal RS has been output from the most-retract-position sensor 432. In other words, if the second detection-target member 456 has been detected by the most-retract-position sensor 432 and a most-retract signal RS has not been output, the procedure goes to step S2. If the most-retracted-position sensor 432 has output a most-retracted signal RS, the procedure goes to step S7.

At step S2, the electric motor 284 is rotated in reverse at low speed or in an inching manner, thereby providing a reversely-rotating movement to the crank pins 230LF, 230LR, 230RF, and 230RR and moving the conveying member 144 to an initial position (position depicted in FIG. 16). The procedure then goes to step S3. With this, the conveying member 144 is moved backward as protruding into the holding room 114 from the opening of the base 116, and the second detection-target member 456 is detected by the most-retracted-position sensor 432. The most-retract-position sensor 432 then outputs a most-retracted position signal RS.

At this time, the conveying member 144 rubs over the surface of the card C. However, since sliding is at low speed, the card C is not damaged.

At step S3, if a most-retracted-position signal RS has been detected, the procedure goes to step S4. If not detected, the procedure goes to step S5.

At step S4, the electric motor 284 is stopped, an initial position process for the conveying member 144 is completed, and then the procedure goes to step S7. With the initial position process, the conveying member 144 is stopped at a position approximately as depicted in FIG. 16.

Thus, in the conveying member 144, the crank pins 230RF, 230RR, 230LF, and 230LR are positioned near the most retract positions (most rightward in FIG. 16) of the cranks 232RF, 232RR, 232LF, and 232LR. With this, the first reciprocating member 184 are moved approximately to the most retract position by the crank pins 230RF, 230RR, 230LF, and 230LR via the levers 206RF, 206RR, 206LF, and 206LR. Also, the crank pins 230RF, 230RR, 230LF, and 230LR are rotated to positions where they do not make contact with the cam 22. Thus, the second reciprocating member 186 is held at a position near the first reciprocating member 184.

In other words, the conveying member 144 is pressed downward by the weight of the card C, and is retracted from the opening 124 of the base 116 to the outside of the holding room 114.

Here, the initial position process can be performed by rotating the electric motor 284 forward. In this case, the card C at the bottom may be dispensed. In that case, the dispensed card C can be returned to the holding room 114.

At step S3, if a most-retracted-position signal RS is not detected, the procedure goes to step S5. At step S5, it is determined whether a predetermined time has passed. If the predetermined time has not passed, the procedure returns to step S3. If the predetermined time has passed, the procedure goes to step S6.

At step S6, it is assumed that an abnormality has occurs such that the conveying member 144 is not moved even if the electric motor 284 rotates. After an error signal is output to an external processing device to cause a display device to perform error display, the procedure ends.

At step S7, the presence or absence of a hold signal FS for the card C from the holding sensor 450 is determined. If the hold signal FS is detected, the procedure goes to step S8. If not detected, the procedure goes to step S9.

At step S9, a no-card signal is output to the external processing device and, after a display prompting for card supply or the like, the procedure ends.

At step S8, it is determined whether a card dispensing signal PS has come from an external control device. If a card dispensing signal PS is detected, the procedure goes to step S10. If not detected, the procedure returns to step S7.

At step S10, the electric motor 284 is rotated forward, and then the procedure goes to step S11. When the electric motor 284 is rotated forward, the clutch strip 272B is rotated via the decelerating mechanism 286, and the clutch strip 272A engaging therewith is rotated. With this, the pinion gears 254L and 254R are rotated in a clockwise direction in FIG. 11 via the rotating shaft 266, the gears 268 and 264, the rotating shaft 265, the bevel gears 258 and 256, and the rotating shaft 252.

Figure 17:
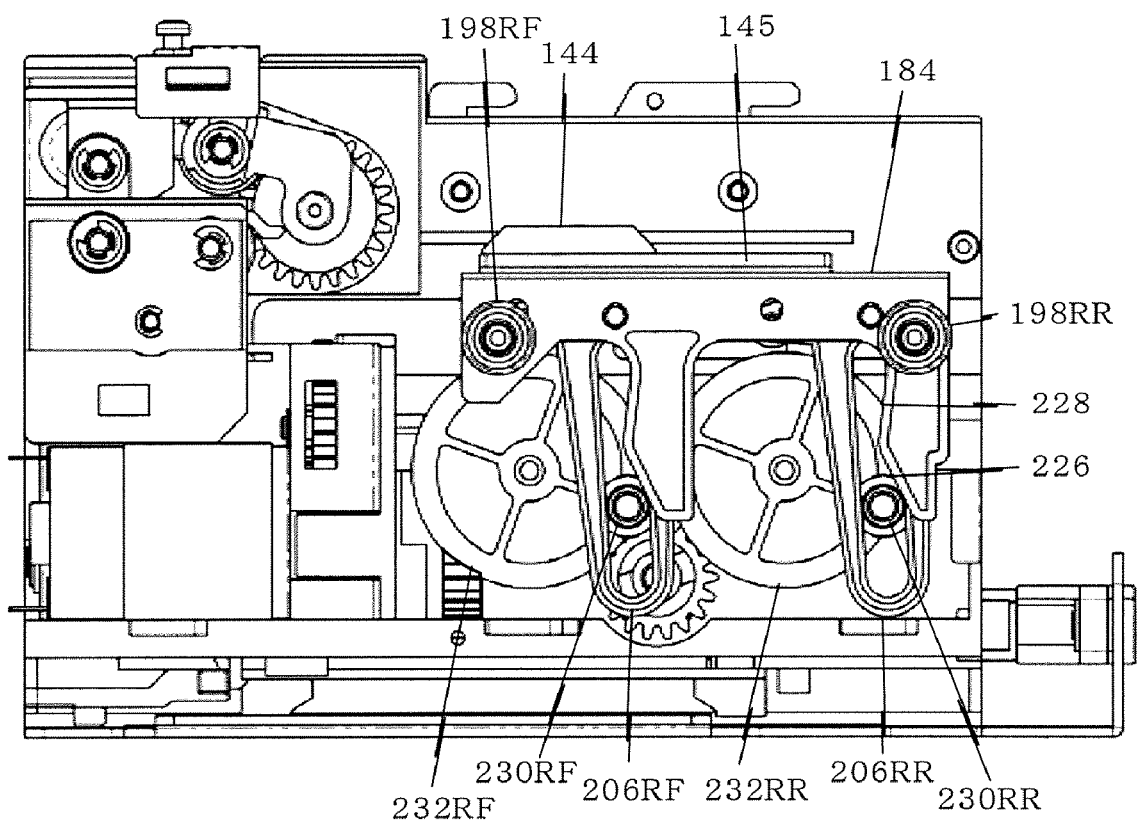

With the rotation of the pinion gears 254L and 254R, the gears 236RF, 236RR, 236LF, and 236LR are rotated in a counterclockwise direction in FIG. 10. Therefore, the crank pins 230RF, 230RR, 230LF, and 230LR follow an arc path to move approximately upward. With this, the crank pins 230RF, 230RR, 230LF, and 230LR make contact with the first cam 226, respectively. Thus, the levers 206RF, 206RR, 206LF, and 206LR are rotated in a clockwise direction in FIG. 17 at a predetermined angle with respect to the first reciprocating member 184.

Thus, the second reciprocating member 186 is pressed upward in a parallel manner by the four-joint parallel link 219 to go away from the first reciprocating member 184 by a predetermined amount. With this movement of the second reciprocating member 186, the conveying member 144 passes through the opening 124 of the base 116 via the holding member 145 to advance into the holding room 114, thereby slightly pushing the card line higher. In other words, the card C at the bottom makes a surface contact with the contact surface 172 of the conveying member 144 to be separated from the base 116.

Furthermore, the cranks 232RF, 232RR, 232LF, and 232LR are rotated in a counterclockwise direction, and the crank pins 230RF, 230RR, 230LF, and 230LR are moved in a lateral direction (leftward in FIG. 18) while drawing an arc path. With this, the first reciprocating member 184 is moved leftward in the drawing. With the rollers 198RF, 198RR, 198LF, and 198LR being guided by the right guiding groove 196R and the left guiding groove 196L, the first reciprocating member 184 is linearly moved leftward in FIG. 18.

Thus, the second reciprocating member 186 is moved in a lateral direction (leftward in the drawing) via the levers 206RF, 206RR, 206LF, and 206LR together with the movement of the first reciprocating member 184. In other words, the conveying member 144 is moved in the dispensing direction.

Interlocked with the movement of the second reciprocating member 186 in the dispensing direction, the crank pins 230RF, 230RR, 230LF, and 230LR make contact with the second cam portion 228. With the second cam 228, the movement is made so that a positional relation of the levers 206RF, 206RR, 206LF, and 206LR with respect to the first reciprocating member 184 is not changed even if the positions of the crank pins 230RF, 230RR, 230LF, and 230LR are fluctuated.

Figure 18:
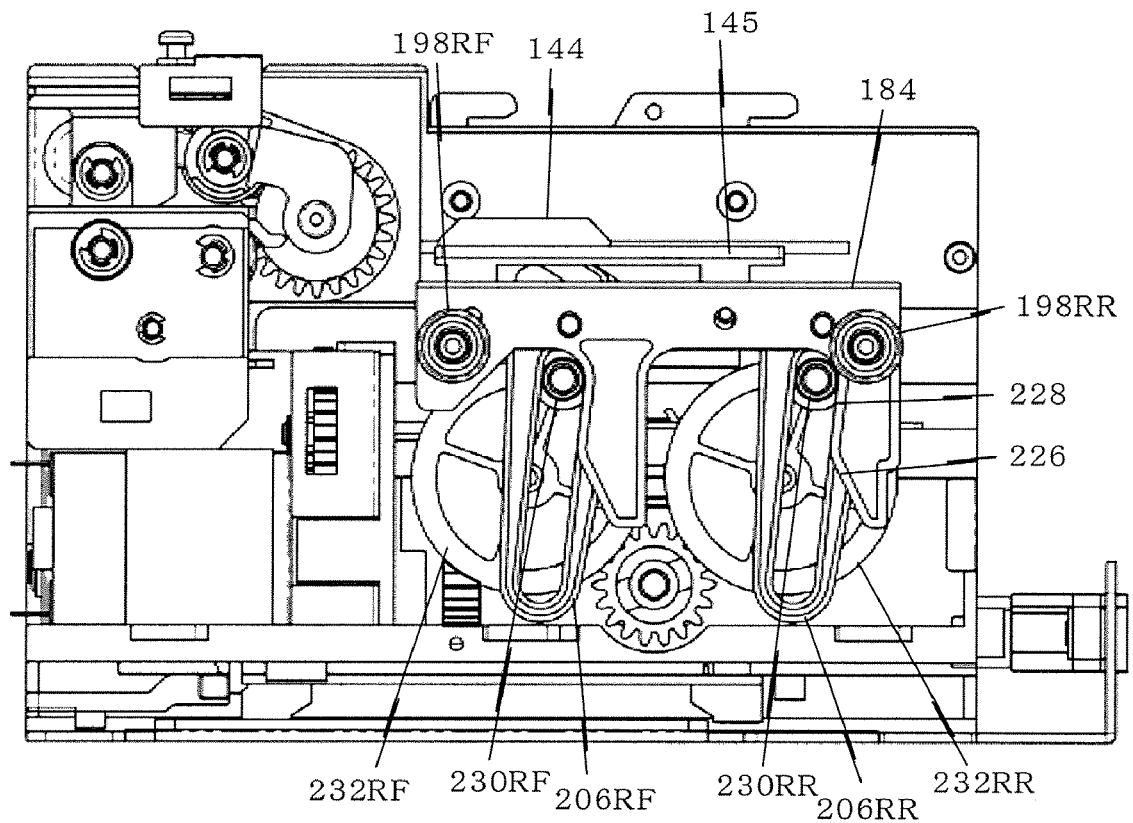
Figure 19:
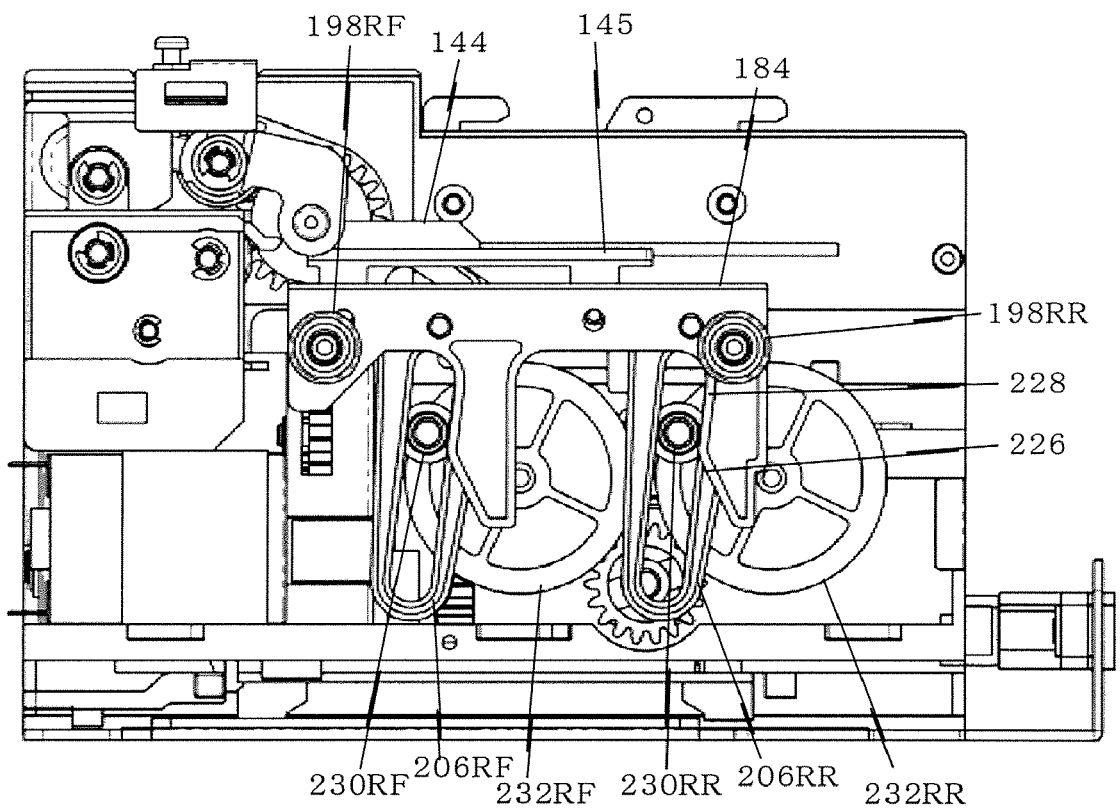

Thus, the conveying member 144 is linearly moved leftward in FIG. 18 while the state where the contact surface 172 makes a surface contact with the surface of the card is continued, and then reaches the most advancing position (FIG. 19). With this, the card C at the bottom is conveyed in the dispensing direction with the friction with the contact surface 172 of the conveying member 144. The stroke of the conveying member 144 is a stroke sufficient for the tip of the card C to reach the feeding unit 334.

Figure 20:
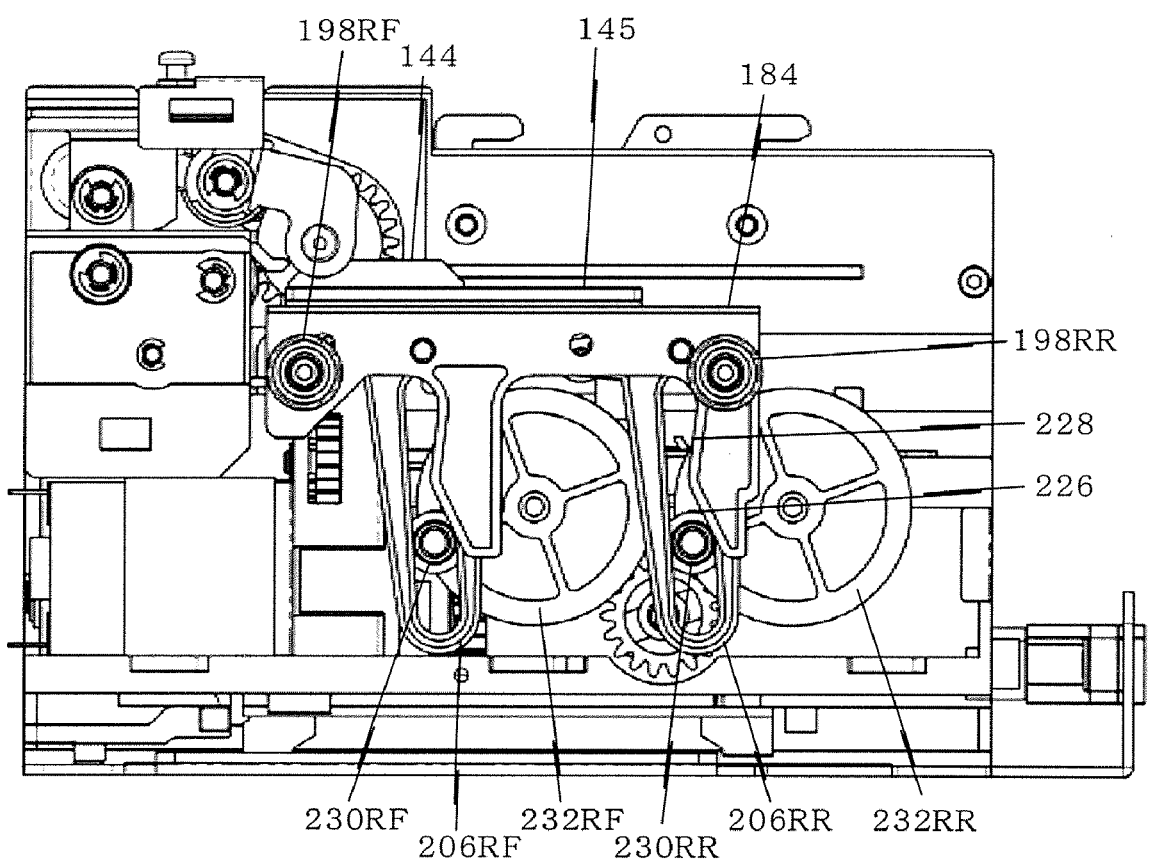

With a further rotation of the cranks 232RF, 232RR, 232LF, and 232LR, when the crank pins 230RF, 230RR, 230LF, and 230LR reach the left end, the crank pins 230RF, 230RR, 230LF, and 230LR move approximately downward while drawing an arc (FIG. 20). Thus, the first reciprocating member 184 continues to be at the most advancing position.

On the other hand, since the crank pins 230RF, 230RR, 230LF, and 230LR make contact with the first cam portion 226, the levers 206RF, 206RR, 206LF, and 206LR are rotated in a counterclockwise direction with respect to the first reciprocating member 184. The second reciprocating member 186 is moved downward in a parallel manner by the parallel link mechanism 219 to approach the first reciprocating member 184.

With this, the conveying member 144 is pressed downward by the weight of the card C for retraction from the opening 124 of the base 116. Therefore, the card C at the bottom is supported by the base 116, thereby releasing the surface contact with the conveying member 144.

With a further rotation of the cranks 232RF, 232RR, 232LF, and 232LR, the crank pins 230RF, 230RR, 230LF, and 230LR are moved rightward in FIG. 20 while drawing an arc. Thus, the first reciprocating member 184 is linearly moved to an anti-dispensing direction via the levers 206RF, 206RR, 206LF, and 206LR. In the course of this, other regulations are not applied to the crank pins 230RF, 230RR, 230LF, and 230LR. Therefore, a relative positional relation between the levers 206RF, 206RR, 206LF, and 206LR and the first reciprocating member 184 is not changed.

Thus, the second reciprocating member 186 is moved rightward in FIG. 20 while the position below the opening 124 is continued, and then reaches a position near the most retracted position (FIG. 16). Near the most retracted position, the second detection-target member 456 is detected by the most-retracted-position sensor 432, which then outputs a most-retracted-position signal RS.

On the other hand, with the rotation of the electric motor 282, the gear 324 is rotated in a clockwise direction in FIG. 8 via the driving device 288. With this, the reverse-rotation roller 336 is rotated in a counterclockwise direction in FIG. 5 via the gears 348, 345, 353, and 357, and the shaft 352.

In other words, the lower surface of the reverse-rotation roller 336 advances in a direction reverse to the dispensing direction of the card C. Furthermore, the rollers 382 and 384 are rotated in the same circumferential velocity in the dispensing direction via the gears 392 and 394.

When the card C at the bottom is dispensed in the dispensing direction with the linear movement of the conveying member 144 in the dispensing direction, the card C passes through the exit 118 of the card holding unit 102 to the card passage 342. Then, the card C is dispensed into the gap between the roller 335 and the reverse-rotation roller 336.

When the number of cards C is one, the spacing between the roller 335 and the reverse-rotation roller 336 is longer than the thickness of one card C and shorter than the thickness of two cards. Therefore, the card C passes without receiving an advancing resistance. The card C that passed is then nipped between the rollers 382 and 384 for dispensing.

The rear end of the dispensed card C is pressed by the card holding member 462 onto the first bearing member 396 for holding. When the card C is nipped between the rollers 382 and 384, the card is forcefully drawn from the card holding unit 102 and the first detecting strip 452 is rotated by the card in a counterclockwise direction in FIG. 4. With this rotation, the first detecting strip 452 is detected by the dispensing sensor 454. The dispensing sensor 454 then outputs a dispensing signal DS.

At step S11, if a most-retracted-position signal RS has been detected and the procedure goes to step S12. If not detected, the procedure goes to step S14.

At step S12, if a dispensing signal DS from the card-dispensing detecting unit 426 has been detected, the procedure goes to step S13. If the dispensing signal DS not detected, the procedure goes to step S16.

At step S13, after stopping power supply to the electric motor 284, the procedure ends, and the conveying member 144 is held at the initial position (FIG. 16).

At step S11, if a most-retracted-position signal RS has not been detected, the procedure goes to step S14, where it is determined whether a predetermined time has passed. If not passed, the procedure returns to step S11, continuing the issuing process.

At step S14, if it is determined that a predetermined time has passed, the procedure goes to step S15. After output an error signal to the external processing device, the issuing process ceases. In other words, it is determined that a flat loop movement did not occur even if a card dispensing operation was performed for a predetermined time, and then the dispensing process of the dispensing apparatus 100 stops.

At step S12, if a card dispensing signal DS has not been detected, the procedure goes to step S16. At step S16, it is determined whether the number of times of the most-retracted-position signal is 2. If it is not 2, the procedure returns to step S11, continuing the dispensing process. In other words, the conveying member 144 again performs a flat loop movement to retry the dispensing of the card C.

In this case, the conveying member 144 provides a dispensing movement to the card C at the bottom. That is, the stroke of the conveying member 144 in the dispensing direction is set in a manner such that, even if the tip of the card at the bottom end reaches a side immediately near the rollers 382 and 384 of the feeding unit 334, the conveying member 144 again advances into the opening 124 to make contact with only the card at the bottom when the conveying member 144 advances to the opening 124 to make contact with the card C.

Here, the stroke of the conveying member 144 is determined by the radius of the cranks 232RF, 232RR, 232LF, and 232LR. The number of times defines the number of times of retry of a flat loop movement by the conveying member 144, and the number can be set as appropriate.

At step S16, if it is determined that the number of times of the most-retracted-position signal is 2, the procedure goes to step S17. At step S17, an error signal is output to the external processing device and, after an error display or the like, the procedure goes to step S13.

At step S13, the electric motor 284 is stopped, and the apparatus stops at the initial position.

In the present invention, the card dispensing unit 104 can be disposed so as to face the card at the top end of the line of stacked cards. In this case, pushing by a pressing unit, such as an elastic member, or weight higher is required so that a card is positioned at the top-end position. Furthermore, in the present invention, dispensing can be made in a state where the card line lays down.

Also in this case, pressing by pressing unit to a lateral direction is required so that the card on a card dispensing unit 104 side is positioned at a predetermined position. Furthermore, the base 116 can be provided separately from the holding member 106 to be disposed on a card dispensing unit 104 side. Here, the initial position can be set in a manner such that the crank pins 230RF, 230RR, 230LF, and 230LR make contact with the first cam 226 and the conveying member 144 pushed the card C higher.

In a second embodiment, any dispensing of duplicate cards at a first dispensing of the card C after the initial setting in the first embodiment can be prevented with a further simplified configuration.

First, concerns in the card dispensing apparatus in the first embodiment are described with reference to FIG. 23.

Figure 23:
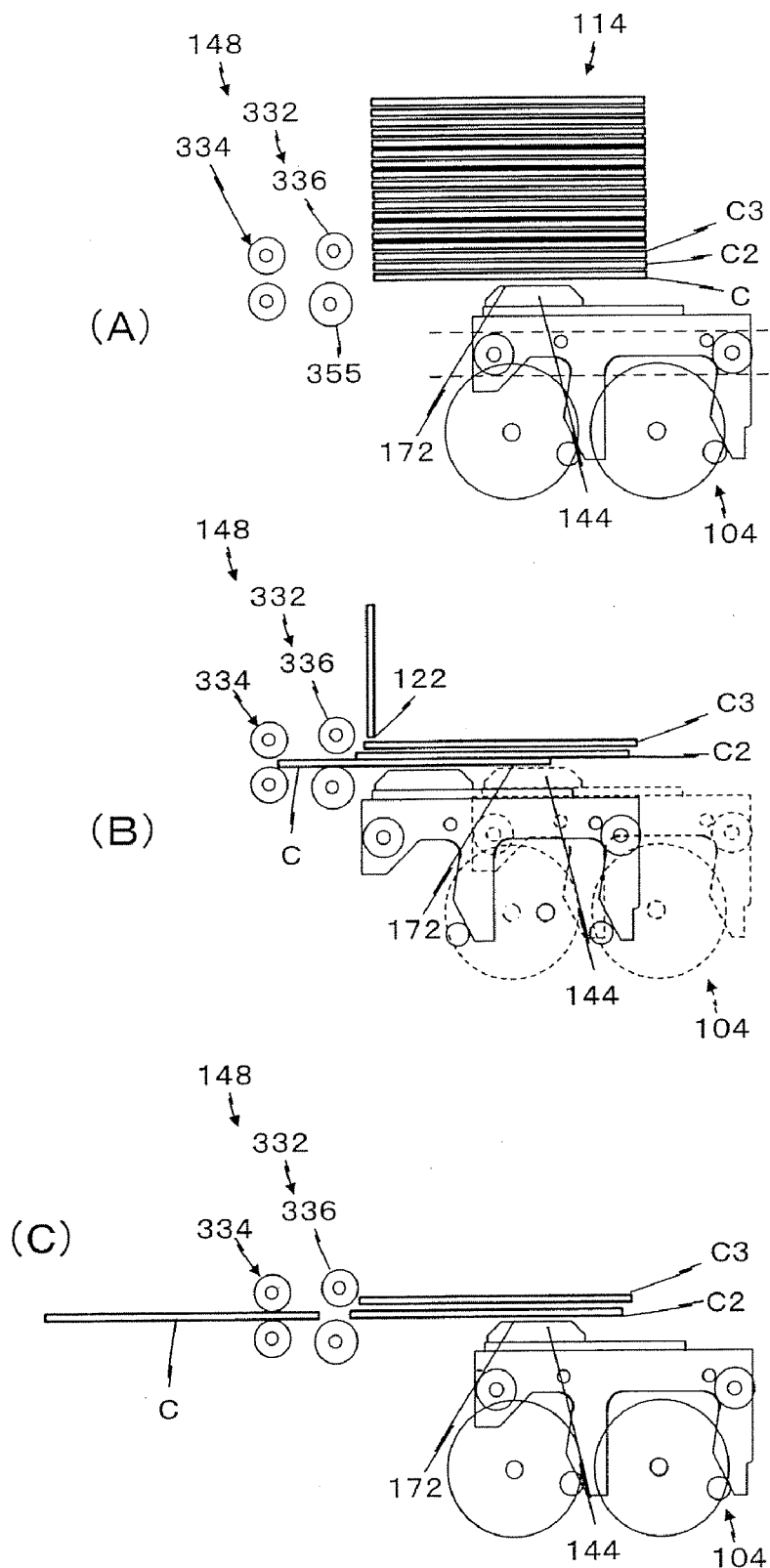
FIG. 23 is an explanatory drawings in the first embodiment.

In this card dispensing apparatus, at the time of initial setting, the card C at the bottom is positioned inside the holding room 114 (refer to FIG. 23 (A)). When the card C at the bottom is dispensed to a drawing unit 148 side with a dispensing movement of the dispensing unit 104, the card C at the bottom passes through a gap between the roller 335 and the reverse-rotation roller 336 to advance to a feeding unit 334 side. A card C2 thereon is drawn together with a frictional contact, but is prevented from advancing by the reverse-rotation roller 336 constituting a two-sheet dispensing preventing unit 332, and therefore is not moved to a feeding unit 334 side (refer to FIG. 23 (B)).

Also, a card C3, which is mounted on the card C2 and which could potentially pass through the exit opening 122, is prevented from advancing by the reverse-rotation roller 336, thereby causing a running state in which cards are stacked stepwise (refer to FIG. 23 (B)).

The stroke of the conveying member 144 has to be set so that the card C is positioned at a initial setting and the tip of the card C reaches the feeding unit 334 even if a certain sliding occurs. However, since the number of cards C in a running state is overwhelmingly larger than the number of times of dispensing the card C from the initial setting, the stroke of the conveying member 144 is set so that dispensing of two cards C in a running state is prevented.

In other words, the stroke of the conveying member 144 is set so that a margin for slipping in drawing from the initial setting state is smaller. Therefore, in dispensing at the time of initial setting, the tip of the card C may reach only immediately before the feeding unit 334 with one stroke of the conveying member 144 (refer to FIG. 23 (B)).

In this case, after step S16 in the first embodiment, the conveying member 144 performs a second dispensing movement. With this, the card C at the bottom is fed to the feeding unit 334 immediately after the start of a dispensing movement of the conveying member 144, and the card C2 thereon is caused by the conveying member 144 to pass through the two-sheet preventing unit 332 for dispensing to a feeding unit 334 side (refer to FIG. 23 (C)). This card C2 has a relatively short distance with the feeding unit 334 because the tip of the card is prevented by the reverse-rotation roller 336, and therefore the card C2 may possibly reach the feeding unit 334 with the second dispensing movement for dispensing.

The second embodiment can prevent such an over-dispensing.

The second embodiment is described with reference to FIG. 21, where portions identical to those in the first embodiment are provided with the same reference numerals, and only the different portion is described. An inclined surface for pushing 462 is formed at a rear end of the base 116 of the holding member 106 constituting the card holding unit 102. The inclined surface for pushing 462 is inclined downward toward the front at an angle of approximately 45 degrees.

In other words, the inclined surface for pushing 462 is inclined downward toward the front to the drawing unit 148, and its lower end approaches the exit 122 by approximately five millimeters. With this configuration, several lower ones of the cards C stacked inside the holding room 114 have their rear ends (end portions on a side opposing to the exit 122) make contact with the inclined surface for pushing 462. Then, with the weight of the cards C mounted thereon, the cards C with their rear ends being pushed onto the inclined surface for pushing 462 are relatively pushed to an exit 122 side. With this, in the initial setting of holding inside the holding room 114, the cards C at the lower portion are stacked stepwise at the exit 122.

Figure 22:
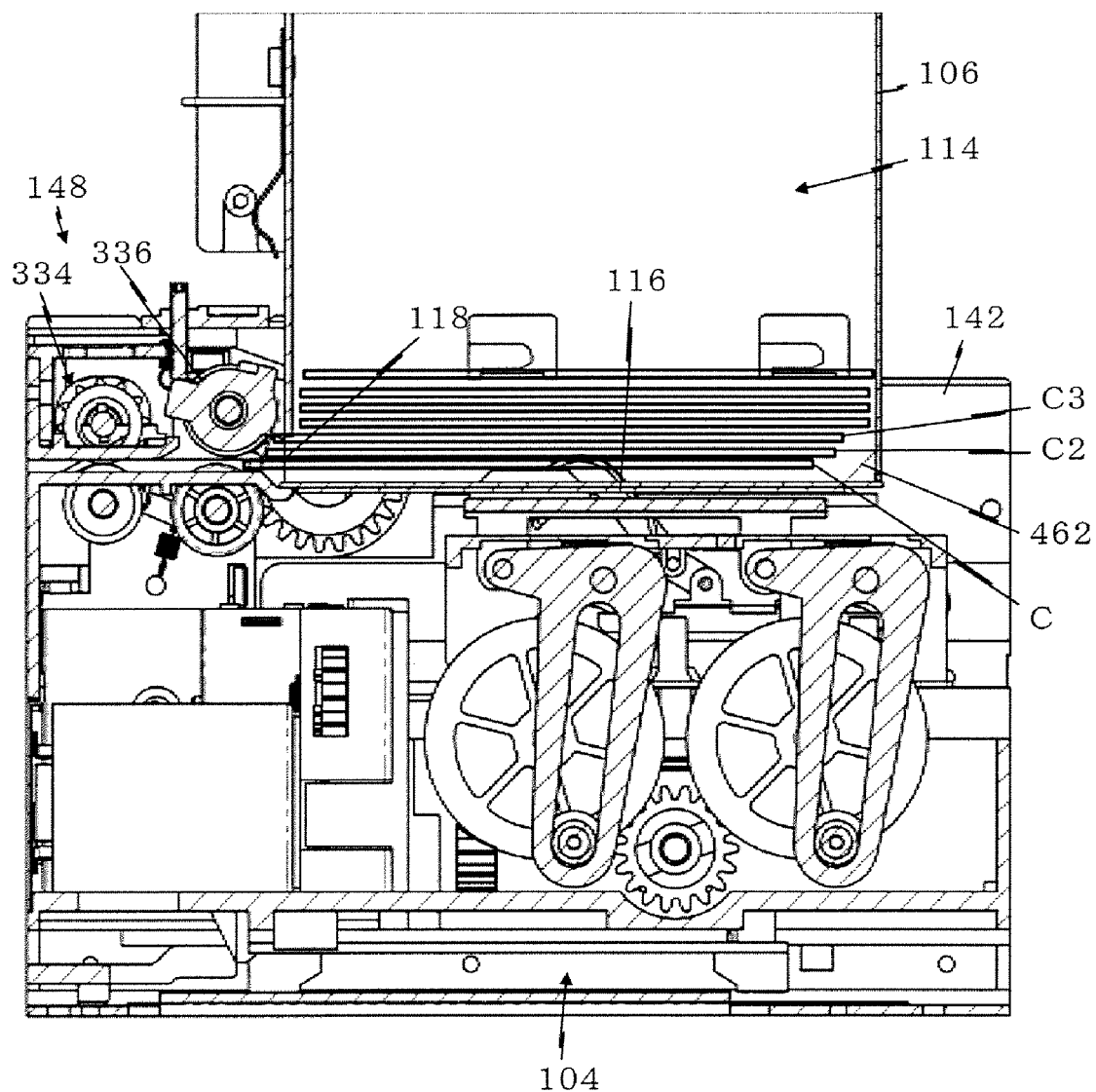
FIG. 22 is an explanatory drawing the second embodiment.

Next, the operation of the second embodiment is described also with reference to FIG. 22.

Figure 21:
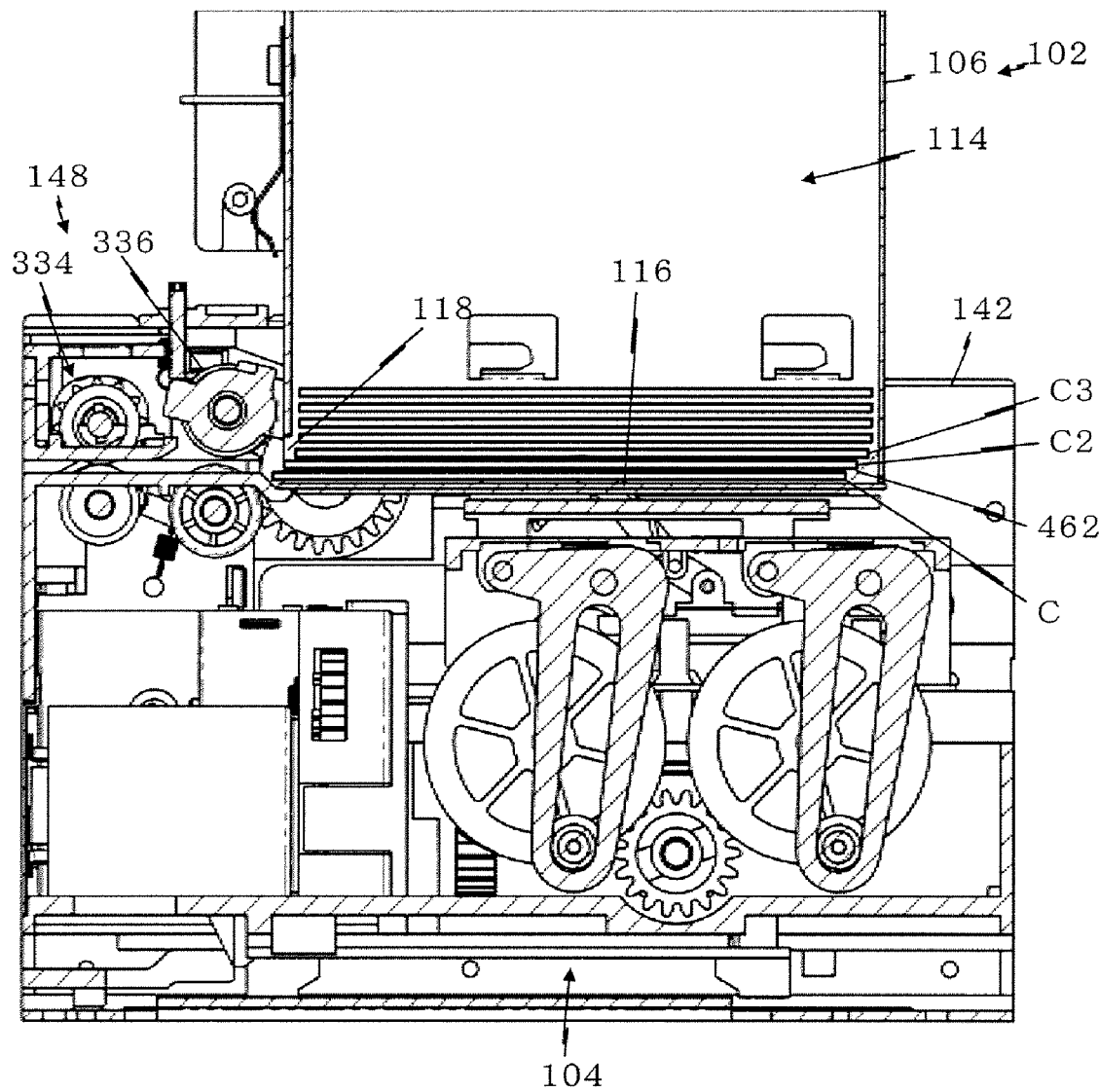
FIG. 21 is a cross sectional view at the same position as that in FIG. 5 in a second embodiment.

When the holding member 106 newly filled with cards C is mounted on the frame unit 142, as depicted in FIG. 21, the card C at the bottom is pushed by pushing out the inclined surface for pushing 462 at the exit 122 to be pushed in a stepwise manner to a drawing unit 148 side for initial setting. This initial setting state resides at a position where the tip of the card C at the bottom is not in contact with the reverse-rotation roller 336 but is close thereto.

Dispensing after two cards C2 . . . is performed from the above-mentioned running state.

In comparison between the initial setting state and the running state, they are similar to each other in that cards are stacked in a stepwise manner, but are different in that the stacking position is slightly away from the drawing unit 148. In this initial setting state, when the conveying member 144 performs an initial dispensing movement, the card C at the bottom passes through the two-sheet dispensing unit 332 to reach the feeding unit 334 for dispensing.

In the second embodiment, the card C at the bottom is moved due to the inclined surface for pushing 462 so as to be close to the feeding unit 334. Therefore, even when the amount of slipping between the conveying member 144 and the card C is larger than what would be assumed, the card C can still be caused to reach the feeding unit 334 due to the closeness in position.

In other words, even if the settings of the conveying member 144 and the like are suitable for dispensing the card C in the running state, the margin for dispensing the card C at the initial setting is increased, and therefore an error in dispensing can be prevented.

The tip of the card C at the bottom in the running state is at the position where the tip makes or substantially makes contact with the reverse-rotation roller 336, and is therefore closer to the feeding unit 334 than the initial setting position. Therefore, the card C at the bottom can be passed with one dispensing movement of the conveying member 144, and therefore an error in dispensing can be prevented.

A third embodiment of the present invention is an embodiment where, since the card is drawn by the feeing unit at a higher speed than the card dispensing unit, even when the amount of stacking cards is increased, difficulty in drawing by the feeding unit can be prevented, as a result, allowing an increase in the amount of stacking cards.

Specifically, in the card dispensing apparatus according to the first and second embodiments, in the state where the dispensed card is fed by the feeding unit, the conveying member makes contact with the lower surface of the card at the bottom for a predetermined time and the card at the bottom will have approximately the entire weight of the stacked cards applied.

The conveying member is formed of a material with a high coefficient of friction so as not to cause any sliding with the card as much as possible. With this, when the amount of stacking cards is increased, the contact pressure between the conveying member and the lower surface of the card is increased. As a result, the drawing resistance of the cards by the feeding unit is significantly increased, thereby making it difficult to draw cards by the drawing unit.

To solve this problem, the feeding unit can be improved in a manner such that, for example, the diameter of the roller is increased to increase the contact area. However, when the roller diameter is increased, the apparatus is unpreferably upsized in proportion to the amount of increase.

To get around this problem, the third embodiment is suggested in which the amount of stacking cards can be increased without upsizing the apparatus.

With reference to FIGS. 24 to 28, the third embodiment of the present invention is described below.

In the description of the third embodiment, the same reference numerals are provided to portions identical to those in the first embodiment or the second embodiment, and a different configuration is described therein. In the third embodiment, a retracting unit 472 is interposed between the second conveying member 186 and the conveying member 144 (refer to FIG. 25). The retracting unit 472 has a function of allowing the conveying member 144 to retracted from the opening 124 of the card holding unit 102 when a drawing force is applied to the conveying member 144 by the card C to be drawn by the feeding unit 334.

In the third embodiment, the retracting unit 472 includes a guide hole 474 and an interlocked shaft 476.

Figure 26:
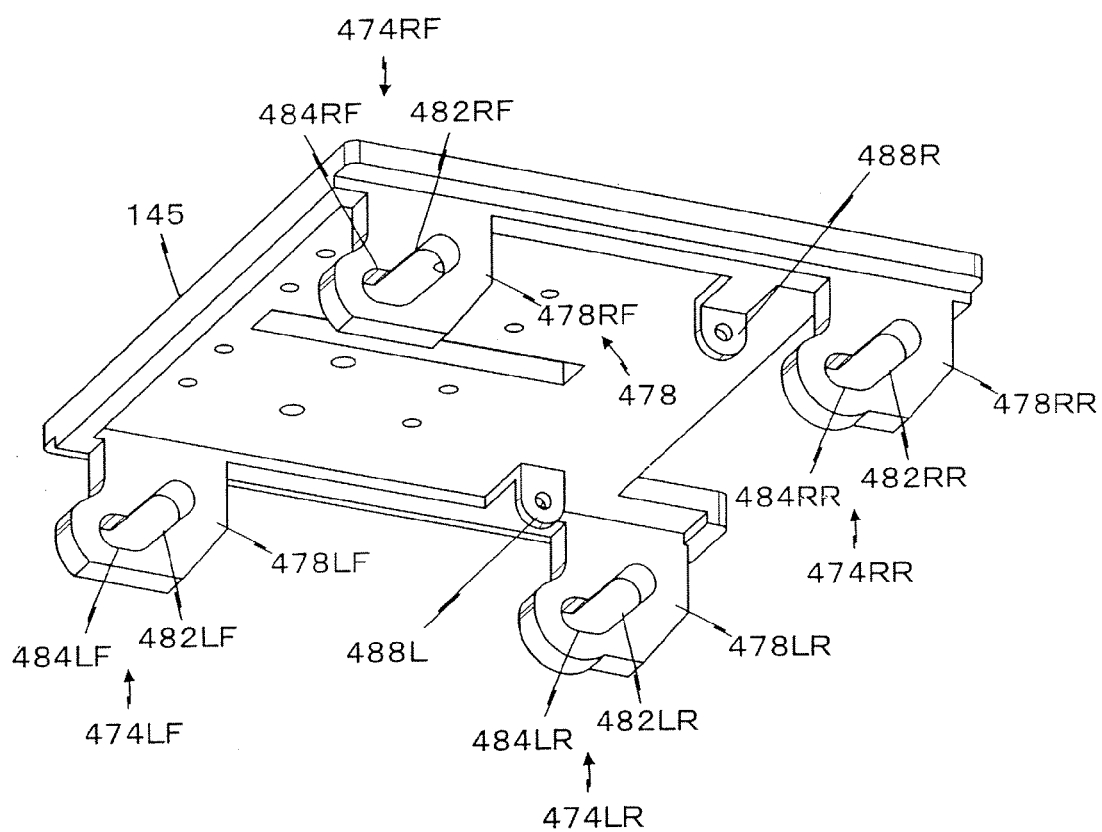
FIG. 26 is a back-surface perspective view of a holding member in the third embodiment.

First, the guide hole 474 is described with reference to FIG. 26.

In the third embodiment, the guide hole 474 is formed on a cam plate 478 protruding from the holding member 145, to which the conveying member 144 is fixed, in a downward direction on an opposite side of the holding room 114. The cam plate 478 is constituted so as to correspond to a relevant one of the levers 206RF, 206RR, 206LF, and 206LR. Therefore, as depicted in FIG. 26, the cam plate 478 is formed of cam plates 478RF, 478RR, 478LF, and 478LR protruding from the front, back, right, and left of the lower surface of the holding member 145 to a downward direction.

The guide hole 474 is constituted of guide holes 474RF, 474RR, 474LF, and 474LR having the same shape and formed on the cam plates 478RF, 478RR, 478LF, and 478LR, respectively. Since all of the guide holes 474RF, 474RR, 474LF, and 474LR are formed in the same shape, the only guide hole 474RF is described as a representative.

The guide hole 474RF includes an inclined hole 482RF and a passive hole 484RF. The inclined hole 482RF is inclined downward to the front to the dispensing direction of the card C, and the inclination angle is preferably approximately 45 degrees with respect to the dispensing direction of the card C.

The passive hole 484RF is continuously formed on a front side of the inclined hole 482RF in the advancing direction of the card C. The passive hole 484RF is formed approximately in parallel to the stacked cards C, and has a length approximately equal to the diameter of an interlocked shaft 476F.

The guide holes 484RF, 484RR, 484LF, and 484LR can be disposed so as to receive a force from a first interlocked shaft 476F or a second interlocked shaft 476R, which will be described further below, at an approximately right angle.

With this configuration, the holding member 145 can be pushed higher without the provision of any means for preventing the movement of the first interlocked shaft 476F with respect to the guide hole 474RF. With such a simple configuration, a small-sized apparatus can be configured at low cost.

Here, with the angle of inclination of the guide hole 474RF being set at 30-45 degrees, preferably 30-35 degrees with respect to the stacked cards C, the conveying member 144 can be pushed higher even without providing the passive hole 484RF.

The reason is as follows: If the angle of inclination of the guide hole 474RF is larger than a predetermined angle, pushing higher cannot be made due to the weight of the stacked cards C or the like. If the angle of inclination is smaller than the predetermined angle, when the conveying member 144 is drawing by the card C, it cannot move together with the card C.

Next, the interlocked shaft 476 is described.

The interlocked shaft 476 has a function of moving, the holding member 145 portions, and therefore, the conveying member 144, along the guide hole 474. The interlocked shaft 476 includes a first interlocked shaft 476F whose right and left ends are inserted into insertion holes at the tip of horizontal portions of the corresponding levers 206RF and 206LF at the front side and a second interlocked shaft 476R whose right and left end portions are inserted into insertion holes at the tip of horizontal portions of the corresponding levers 206RR and 206LR at the rear side.

The first interlocked shaft 476F connects the levers 206RF and 206LF together so that they integrally rock, whilst the second interlocked shaft 476R connects the levers 206RR and 206LR together so that they integrally rock. The first interlocked shaft 476F penetrates through the guide holes 474RF and 474LF. The second interlocked shaft 476R penetrates through the guide holes 474RR and 474LR.

In other words, the first interlocked shaft 476F is a round-bar shaft provided correspondingly to the shafts 218RF and 218LF in the first and second embodiments, so is the second interlocked shaft 476R correspondingly to the shafts 218RR and 218LR.

Here, if the conveying member 144 can be pushed higher by the levers 206RF and 206LF on one side and the first interlocked shaft 476F, and the second interlocked shaft 476R, symmetrical provision as in the third embodiment is not required. However, in the case of symmetrical provision as in the third embodiment, the conveying member 144 can be pushed higher without being inclined even if the load amount of the cards C is increased. Therefore, such a case is preferable.

Next, the pressing unit 486 is described.

The pressing unit 486 has a function of elastically pressing the holding member 145 and, by extension, the conveying member 144, toward the first reciprocating member 184 in the anti-dispensing direction of the cards C. In other words, the pressing unit 486 has a function of, with the holding member 145 being pressed rightward in FIG. 25, positioning the first interlocked shaft 476F at the passive holes 484RF and 484LF and the second interlocked shaft 476R at the passive holes 484RR and 484LR.

Figure 24:
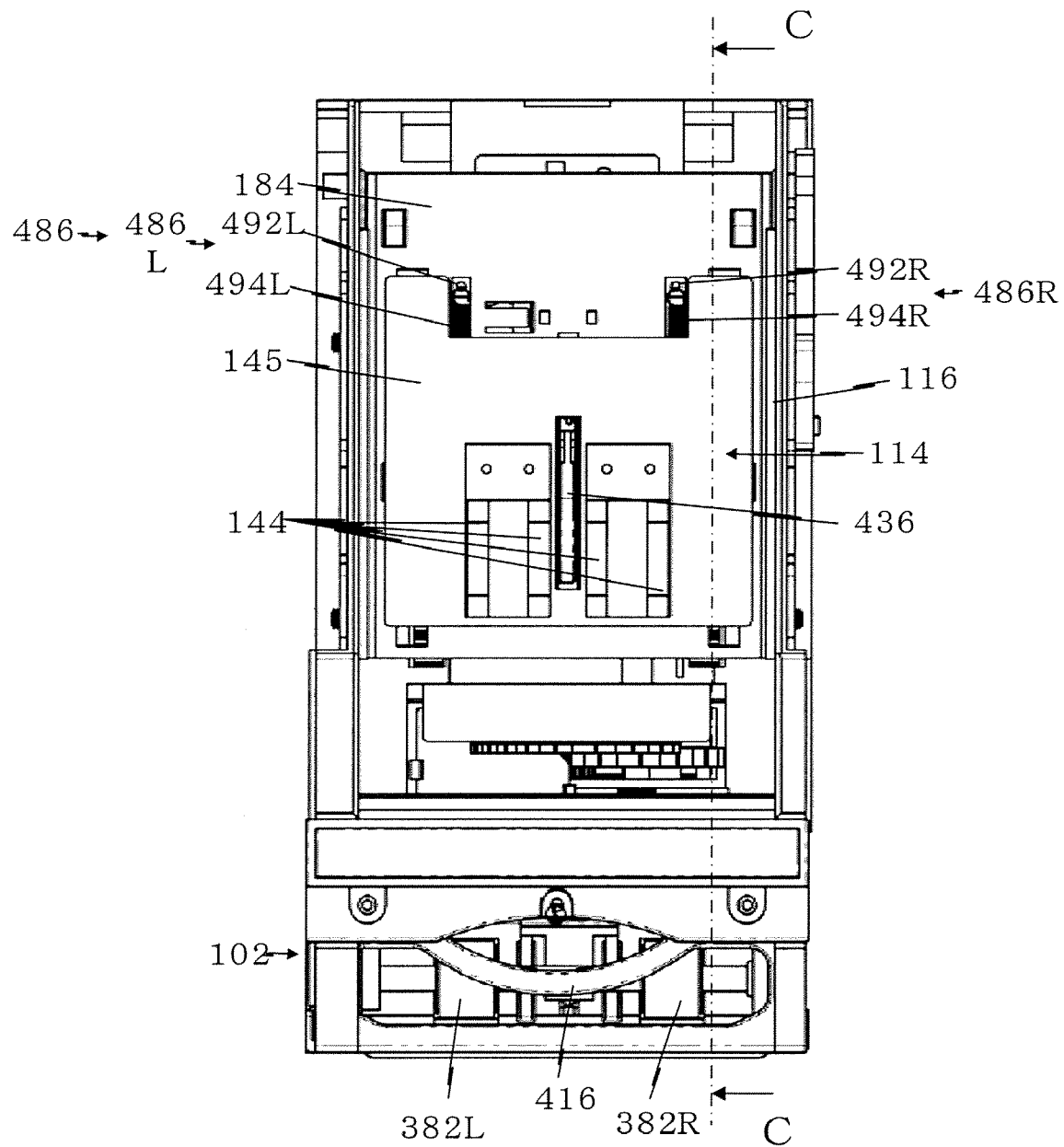
FIG. 24 is a plan view of card dispensing means 104 in a state where card holding means 102 is removed according to a third embodiment.

The pressing unit 486 includes first pressing unit 486L and second pressing unit 486R (refer to FIG. 24). The first pressing unit 486L is a first spring 494L hung between a first engaging strip 488L protruding downward from the lower surface of the holding member 145 and a first engaging hole 492L formed on the first reciprocating member 184. The second pressing unit 486R is a second spring 494R hung between a second engaging strip 488R protruding downward from the lower surface of the holding member 145 and a second engaging hole 492R formed on the first reciprocating member 184.

The first spring 494L and the second spring 494R can be replaced by other elastic pressing unit, such as rubber strings, and either one of them will suffice if the function described above can be achieved. However, by using the first spring 494L and the second spring 494R, the holding member 145 can be moved in a parallel manner without being inclined. Therefore, such use is preferable.

With this configuration, normally, the holding member 145 is pulled leftward in FIG. 27 (B) by the first spring 494L and the second spring 494R, the first interlocked shaft 486F is engaged at end portions of the passive holes 484RF and 484LF, and the second interlocked shaft 486R is engaged at end portions of the passive holes 484RR and 484LR.

Figure 25:
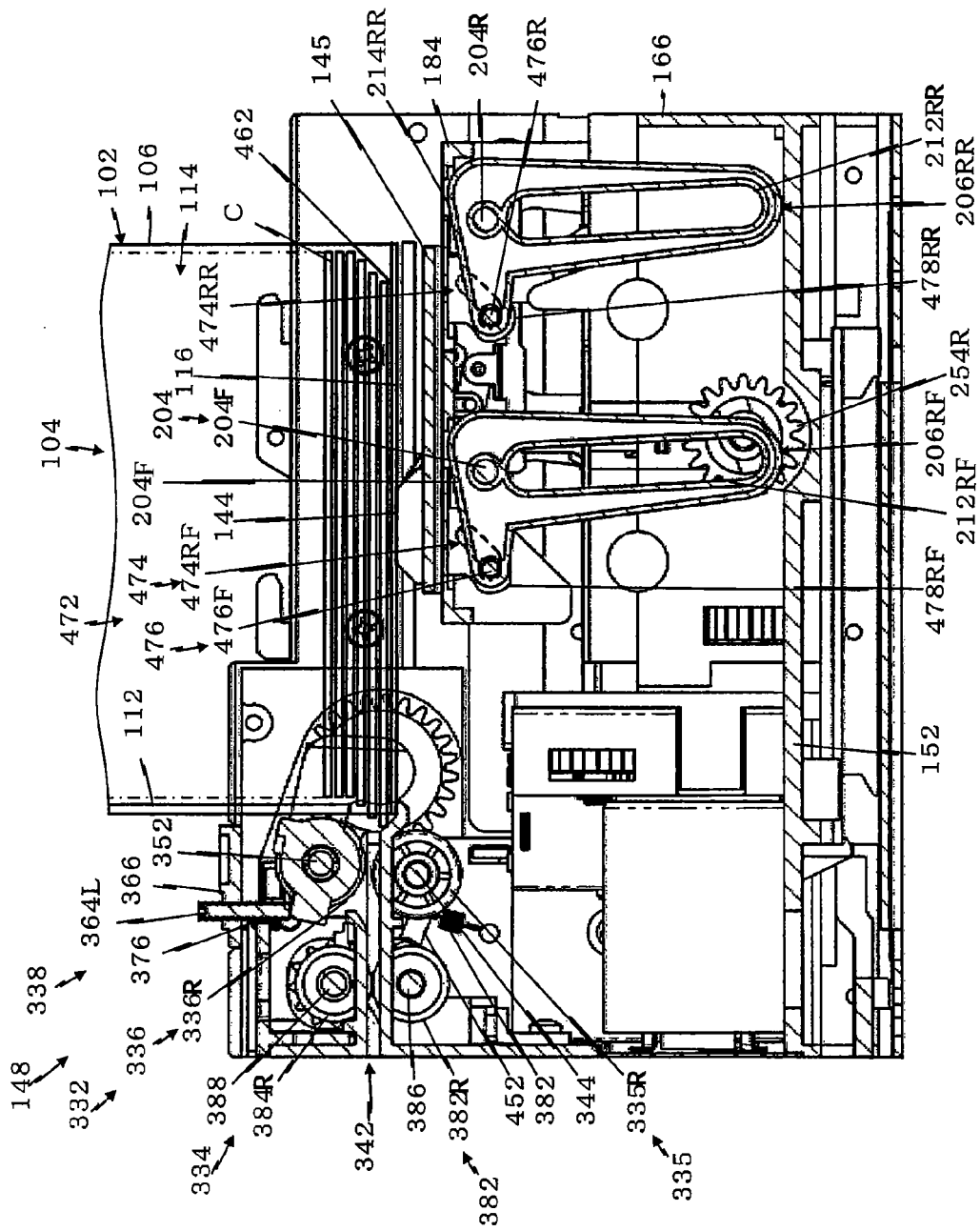
FIG. 25 is a cross sectional view along a C-C line in FIG. 24.

With this, when the levers 206RF, 206LF, 206RR, and 206LF are rotated in a clockwise direction in FIG. 25, the first interlocked shaft 476F pushes higher in a direction forming an approximately right angle with respect to upper edges of the passive holes 484RF and 484LF and the second interlocked shaft 476R pushes higher in a direction forming an approximately right angle with respect to upper edges of the passive holes 484RR and 484LR. Therefore, the conveying member 144, resultantly, the stacked cards C, can be pushed higher without provision of other holding means. Also, in this state, when the conveying member 144 is moved leftward in FIG. 27 (B), the first connecting shaft 476F and the second connecting shaft 476R are in a stationary state with respect to the holding member 145.

Thus, the holding member 145 moves leftward in FIG. 27 (B) with respect to the first reciprocating member 184. The first interlocked shaft 476F and the second interlocked shaft 476R relatively move from the passive holes 484LF, 484RF, 484LR, and 484RR to the inclined holes 482RF, 482LF, 482RR, and 482LR. With this, the holding member 145 is guided to the inclined holes 482RF, 482LF, 482RR, and 482LR to move downward and diagonally forward with respect to the first reciprocating member 184. In other words, the conveying member 144 moves in a direction of retracting from the openings 124A, 124B, and 124C of the holding member 106. Furthermore, in other words, the conveying member 144 moves from the holding room 114 in a retracting direction.

Next, the operation of the third embodiment is described also with reference to FIGS. 27 and 28.

With a dispensing signal, the crank pins 230RF, 230RR, 230LF, and 230LR move approximately upward along an arc path. With this, when the cranks 232RF, 232RR, 232LF, and 232LR rotate in a counterclockwise direction from the initial state in FIG. 25, as with the first embodiment, the crank pins 230RF, 230RR, 230LF, and 230LR make contact with the first cam 226, respectively. Therefore, the levers 206RF, 206RR, 206LF, and 206LR are rotated at a predetermined angle in a clockwise direction with respect to the first reciprocating member 184 to be in the state shown in FIG. 27.

According to the rotation of the levers 206RF, 206RR, 206LF, and 206LR, the first interlocked shaft 476F and the second interlocked shaft 476R rotate in the same direction about the pivot shaft 204F and 204R. With this, the first interlocked shaft 476F pushes higher in a direction forming an approximately right angle with respect to upper edges of the passive holes 484RF and 484LF and the second interlocked shaft 476R pushes higher in a direction forming an approximately right angle with respect to upper edges of the passive holes 484RR and 484LR.

Thus, the second reciprocating member 186 is pushed in a parallel manner to go away from the first reciprocating member 184 by a predetermined amount. With this movement of the second reciprocating member 186, the conveying member 144 passes through the opening 124 of the base 116 via the holding member 145 to advance into the holding room 114, thereby slightly pushing the card line higher.

In other words, the card C at the bottom makes a surface contact with the contact surface 172 to be separated from the base 116 (refer to FIGS. 27(A) and 27(B)). Furthermore, the cranks 232RF, 232RR, 232LF, and 232LR are rotated in a counterclockwise direction, and the crank pins 230RF, 230RR, 230LF, and 230LR move in a lateral direction (leftward in FIG. 27 (A)) while drawing an arc path. With this, the first reciprocating member 184 is moved leftward in FIG. 27 (A).

The first reciprocating member 184 linearly moves leftward while the rollers 198RF, 198RR, 198LF, and 198LR are guided by the right guiding groove 196R and the left guiding groove 196L. Thus, the second reciprocating member 186 is moved in a lateral direction (leftward in FIG. 27) together with the movement of the first reciprocating member 184 via the levers 206RF, 206RR, 206LF, and 206LR.

At this time, the first interlocked shaft 476F and the second interlocked shaft 476R push and move the front edges of the passive holes 484RF, 484LF, 484RR, and 484LR. Therefore, the holding member 145, resultantly, the conveying member 144, is moved in the dispensing direction of the card C. Thus, even if the guide holes 474LF, 474RF, 474LF, and 474RR are long holes, the conveying member 144 can be moved in the dispensing direction of the card C.

Interlocked with the movement of the second reciprocating member 186 in the dispensing direction, the crank pins 230RF, 230RR, 230LF, and 230LR make contact with the second cam portion 228. With the second cam 228, the movement is made so that a positional relation of the levers 206RF, 206RR, 206LF, and 206LR with respect to the first reciprocating member 184 is not changed even if the positions of the crank pins 230RF, 230RR, 230LF, and 230LR are fluctuated.

Thus, the conveying member 144 is linearly moved leftward from the position in FIG. 25 while the state where the contact surface 172 makes a surface contact with the lower surface of the card C is continued, and then reaches the most advancing position (FIG. 28 (A)). With this, the card at the bottom is conveyed in the dispensing direction with the friction with the contact surface 172 of the conveying member 144. The stroke of the conveying member 144 is a stroke sufficient for the tip of the card C to reach the feeding unit 334.

When the tip of the card C is nipped between the roller 384R and the roller 382R, the card C is pulled at the circumferential velocity of the rollers 382R and 384R. In other words, the card C is pulled at a speed twice to six times faster than the dispensing speed of the conveying member 144.

With this, the card C is drawn between the conveying member 144 and the stacked cards C. Since the conveying member 144 is formed of a high-frictional material, when pulled in the card dispensing direction together with the movement of the card C, the holding member 145 as the second reciprocating member 186 is relatively moved with respect to the first reciprocating member 184 in the dispensing direction of the card C.

With this, the first interlocked shaft 476F and the second interlocked shaft 476R relatively move from the passive holes 484LF, 484RF, 484LR, and 484RR to the inclined holes 482LF, 482RF, 482LR, and 482 RR. As a result, the holding member 145, therefore the conveying member 144, moves in a direction of retracting from the holding room 114 (as shown chain line in FIG. 28). The card C is now supported by the base 116 and, as a result, the contact pressure between the conveying member 144 and the lower surface of the card C is significantly reduced.

A drawing resistance at the time of drawing the card C with the rollers 384R and 382R is determined broadly by the coefficient of friction between the base 116 and the card C and the weight of the stacked cards C. Thus, the influence of the conveying member 144, which is a high-frictional material, onto the drawing of the card C can be reduced as much as possible. Therefore, even if the amount of stacking the cards C is significantly increased (for example, doubled), the card C can be drawn without changing the diameter of the rollers 384R and 382R.

With a further rotation of the cranks 232RF, 232RR, 232LF, and 232LR, when the crank pins 230RF, 230RR, 230LF, and 230LR reach the left end portion, the crank pins 230RF, 230RR, 230LF, and 230LR move approximately downward while drawing an arc (refer to FIG. 20). Thus, the first reciprocating member 184 continues to be at the most advancing position.

On the other hand, since the crank pins 230RF, 230RR, 230LF, and 230LR make contact with the first cam portion 226, the levers 206RF, 206RR, 206LF, and 206LR are rotated in a counterclockwise direction with respect to the first reciprocating member 184. With the rotation in the counterclockwise direction of the levers 206RF, 206RR, 206LF, and 206LR in FIG. 28 (A), the first interlocked shaft 476F and the second interlocked shaft 476R move downward, and therefore the second reciprocating member 186 is moved downward in a parallel manner by the weight of the cards C or the like to approach the first reciprocating member 184.

As a result, the conveying member 144 is retracted from the opening 124 of the base 116. Therefore, the card C at the bottom is supported by the base 116, thereby releasing the surface contact with the conveying member 144. When the frictional contact force between the conveying member 144 and the lower surface of the card C is lower than the pressing force of the first spring 494L and the second spring 494R, the conveying member 144 is drawn by the pressing force of these springs until the first interlocked shaft 476F and the second interlocked shaft 476R are engaged with the tip portions of the passive holes 484LF, 484RF, 484LR, and 484RR.

With a further rotation of the cranks 232RF, 232RR, 232LF, and 232LR, the crank pins 230RF, 230RR, 230LF, and 230LR are moved rightward in FIG. 20 while drawing an arc (refer to FIG. 21). Thus, the first reciprocating member 184 is linearly moved to an anti-dispensing direction via the levers 206RF, 206RR, 206LF, and 206LR.

In the course of this, other regulations are not applied to the crank pins 230RF, 230RR, 230LF, and 230LR. Therefore, a relative positional relation between the levers 206RF, 206RR, 206LF, and 206LR and the first reciprocating member 184 is not changed. Thus, the second reciprocating member 186 is moved rightward while the position below the opening 124 is continued, and then reaches a position near the most retracted position (refer to FIG. 25).

Near the most retracted position, the second detection-target member 456 is detected by the most-retracted-position sensor 432. The apparatus is stopped at this state in preparation for the next feeding.

Those skilled in the art will appreciate that various adaptations and modifications of the just-described preferred embodiment can be configured without departing from the scope and spirit of the invention. Therefore, it is to be understood that, within the scope of the amended claims, the invention may be practiced other than as specifically described herein.

What is claimed is:

1. A card dispensing apparatus in which a surface of the lowest card in a stack of cards is pressed toward a fixed base comprising:
    a conveying member, in contact with a card surface via an opening in the base, is moved in a predetermined direction, thereby dispensing cards, one by one in the predetermined direction, wherein the conveying member has a flat contact surface; and
    a movement unit advances a portion of the conveying member into the base opening from a predetermined advancing position to make a surface contact with the card surface, the movement unit linearly moves in a predetermined direction while maintaining a contact state to dispense the card, and subsequently retracts from the opening to a retracted position, and then again moves to the predetermined advancing position for a subsequent dispensing action,
    wherein the movement unit includes a reciprocating member that linearly reciprocates in the card dispensing direction and moves in a direction forming a right angle with the dispensing direction, the reciprocating member includes a first reciprocating member that linearly reciprocates in the card dispensing direction and a second reciprocating member that reciprocates in a direction forming a right angle with a moving direction of the first reciprocating member,
    wherein the second reciprocating member has an L shape, the second reciprocating member has a plurality of elongated holes extending in a direction forming a right angle with a moving direction of the first reciprocating member and is pivotally supported by the first reciprocating member, the elongated holes accommodate crank pins inserted therein, the crank pins make contact with a cam that moves, in the course of rotation, integrally with the first reciprocating member from an area near a most retracted position of the first reciprocating member to an area near a most advancing position thereof, and, with the crank pins making contact with the cam, the second reciprocating member is caused to make a pivotal movement to cause the conveying member to move in a direction away from the first reciprocating member.

2. The card dispensing apparatus according to claim 1 wherein a plurality of said second reciprocating members are disposed so as to be shifted in the card dispensing direction.

3. The card dispensing apparatus according to claim 1, wherein the crank pins protrude from respective cranks each mounted at both ends of a relevant one of rotating shafts disposed so as to form a right angle with a card advancing direction, and the rotating shafts are disposed among the cranks and are gear-connected with an output shaft of an electric motor with a rotating axis line being orthogonal to the rotating shafts.

4. The card dispensing apparatus according to claim 1, further comprising a card drawing unit adjacent to the conveying member, wherein a stroke of the conveying member in the dispensing direction is within a range facing a last end card when a tip of the card is near a card drawing unit.

5. The card dispensing apparatus according to claim 4, wherein the base has a pressing inclined surface that faces a rear end of the card and is inclined in a front downward direction toward a card drawing unit, and a card mounted on the base is pressed toward the card drawing unit.

6. The card dispensing apparatus according to claim 1, wherein the conveying member includes a plurality of elongated rubber members that are spaced from each other and extend through the opening in the base when in contact with the card surface.

7. The card dispensing apparatus according to claim 6 wherein the opening in the base is divided into a plurality of elongated openings, each of a length longer than a surface of the elongated rubber members.

8. The card dispensing apparatus according to claim 1 wherein the conveying member is further elevated at an end of a horizontal movement above the base.

9. A card dispensing apparatus in which a surface of the lowest card in a stack of cards is pressed toward a fixed base comprising:
    a conveying member, in contact with a card surface via an opening in the base, is moved in a predetermined direction, thereby dispensing cards, one by one in the predetermined direction, wherein the conveying member has a flat contact surface; and
    a movement unit advances a portion of the conveying member into the base opening from a predetermined advancing position to make a surface contact with the card surface, the movement unit linearly moves in a predetermined direction while maintaining a contact state to dispense the card, and subsequently retracts from the opening to a retracted position, and then again moves to the predetermined advancing position for a subsequent dispensing action,
    wherein the movement unit includes a pair of driver crank members, a pair of first and second reciprocating members interconnected with the pair of driver crank members for driving the conveying member upward through the opening in the base and horizontally across a plane defined by a base surface to release its card from the stack as the conveying member is moved below the base and returned horizontally to a position to repeat the cycle of operation, wherein the crank pins protrude from the respective pair of driver crank members each mounted at both ends of a relevant one of rotating shafts disposed so as to form a right angle with a card advancing direction, and the rotating shafts are disposed among the pair of driver crank members and are gear-connected with an output shaft of an electric motor with a rotating axis line being orthogonal to the rotating shafts.

10. The card dispensing apparatus according to claim 9, wherein the second reciprocating member has an L shape, the second reciprocating member has a plurality of elongated holes extending in a direction forming a right angle with a moving direction of the first reciprocating member and is pivotally supported by the first reciprocating member, the elongated holes accommodate crank pins inserted therein, the crank pins make contact with a cam that moves, in the course of rotation, integrally with the first reciprocating member from an area near a most retracted position of the first reciprocating member to an area near a most advancing position thereof, and, with the crank pins making contact with the cam, the second reciprocating member is caused to make a pivotal movement to cause the conveying member to move in a direction away from the first reciprocating member.

11. The card dispensing apparatus according to claim 10, wherein a plurality of said second reciprocating members are disposed so as to be shifted in the card dispensing direction.

12. The card dispensing apparatus according to claim 9, further comprising a card drawing unit adjacent to the conveying member, wherein a stroke of the conveying member in the dispensing direction is within a range facing a last end card when a tip of the card is near a card drawing unit.

13. The card dispensing apparatus according to claim 12, wherein the base has a pressing inclined surface that faces a rear end of the card and is inclined in a front downward direction toward a card drawing unit, and a card mounted on the base is pressed toward the card drawing unit.

14. The card dispensing apparatus according to claim 9, wherein the conveying member includes a plurality of elongated rubber members that are spaced from each other and extend through the opening in the base when in contact with the card surface.

15. The card dispensing apparatus according to claim 14 wherein the opening in the base is divided into a plurality of elongated openings, each of a length longer than a surface of the elongated rubber members.

* * * * *